US012675136B2

(12) United States Patent
Lee et al.

(10) Patent No.: US 12,675,136 B2
(45) Date of Patent: Jul. 7, 2026

(54) DISPLAY DEVICE COMPRISING A WINDOW AND A POLARIZATION LAYER PROTRUDING MORE OUTWARD THAN A DISPLAY PANEL AND METHOD FOR MANUFACTURING THE SAME

(71) Applicant: Samsung Display Co., LTD., Yongin-si (KR)

(72) Inventors: Yun Young Lee, Yongin-si (KR); Eun Kyung Yeon, Yongin-si (KR); Jung Kyu Lee, Yongin-si (KR); Hoi Kwan Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 338 days.

(21) Appl. No.: 18/369,749

(22) Filed: Sep. 18, 2023

(65) Prior Publication Data

US 2024/0281036 A1     Aug. 22, 2024

(30) Foreign Application Priority Data

Feb. 22, 2023     (KR) ........................ 10-2023-0023372

(51) Int. Cl.
*G06F 1/16*          (2006.01)
(52) U.S. Cl.
CPC .......... *G06F 1/1656* (2013.01); *G06F 1/1616* (2013.01)

(58) Field of Classification Search
CPC ........................... H10K 50/842; H10K 59/872
See application file for complete search history.

(56) References Cited

U.S. PATENT DOCUMENTS

| | | | | |
|---|---|---|---|---|
| 2016/0066440 A1* | 3/2016 | Choi | ....................... | G06F 1/203 |
| | | | | 361/679.3 |
| 2019/0324310 A1* | 10/2019 | Kudo | ................. | G02F 1/13338 |
| 2020/0166809 A1* | 5/2020 | Kiyota | ................. | G02F 1/1339 |
| 2021/0327312 A1* | 10/2021 | Choi | ..................... | G06F 1/1652 |

FOREIGN PATENT DOCUMENTS

| | | | | | |
|---|---|---|---|---|---|
| CN | 114596775 A | * | 6/2022 | ............. | G09F 9/301 |
| CN | 113223414 B | * | 5/2023 | ............. | G09F 9/301 |
| JP | 2015-162184 A | | 9/2015 | | |
| KR | 2012-0003808 A | | 1/2012 | | |
| KR | 10-1558584 B1 | | 10/2015 | | |
| KR | 2017-0132398 A | | 12/2017 | | |
| KR | 10-2018-0098445 A | | 9/2018 | | |
| KR | 10-2373615 B1 | | 3/2022 | | |

* cited by examiner

*Primary Examiner* — Paul C Lee
(74) *Attorney, Agent, or Firm* — Womble Bond Dickinson (US) LLP

(57)          ABSTRACT

A display device includes a display panel having a display area and a non-display area, a polarization layer on a first surface of the display panel and covering the display area and a portion of the non-display area adjacent to the display area, and a window directly on the polarization layer and covering the display area and the portion of the non-display area adjacent to the display area, the window including a curved portion on the portion of the non-display area.

18 Claims, 25 Drawing Sheets

DISPLAY DEVICE COMPRISING A WINDOW AND A POLARIZATION LAYER PROTRUDING MORE OUTWARD THAN A DISPLAY PANEL AND METHOD FOR MANUFACTURING THE SAME

CROSS-REFERENCE TO RELATED APPLICATION

This application claims priority to and the benefit of Korean Patent Application No. 10-2023-0023372 filed on Feb. 22, 2023, in the Korean Intellectual Property Office, the content of which is incorporated by reference herein in its entirety.

BACKGROUND

1. Field

Aspects of embodiments of the present disclosure relate to a display device and a method for manufacturing the same.

2. Description of the Related Art

The importance of display devices has steadily increased with the development of multimedia technology. Accordingly, various types of display devices such as a liquid crystal display device, organic light emitting diode display devices and the like have been developed.

SUMMARY

Aspects of some embodiments of the present disclosure are directed to a display device including a window having a smooth curved portion and a method of manufacturing the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some embodiments of the present disclosure, there is provided a display device including: a display panel having a display area and a non-display area; a polarization layer on a first surface of the display panel and covering the display area and a portion of the non-display area adjacent to the display area; and a window directly on the polarization layer and covering the display area and the portion of the non-display area adjacent to the display area, the window including a curved portion on the portion of the non-display area.

In some embodiments, the display panel includes: a first flat area including the display area; and a bending area extending from the first flat area and including a portion of the non-display area.

In some embodiments, the polarization layer covers the first flat area and a portion of the bending area, is attached on the first flat area, and is separated from the bending area.

In some embodiments, the polarization layer and the window extend in a direction opposite to the bending area on a plane crossing a thickness direction of the display panel to protrude more outward than the display panel.

In some embodiments, the display panel further having a second flat area extending from the bending area and including another portion of the non-display area.

In some embodiments, the display panel is bent in the bending area so that a second surface of the first flat area faces a second surface of the second flat area.

In some embodiments, the display device further includes at least one of: a cover panel on a second surface of the display panel in the first flat area and the second flat area; a driving circuit on the first surface of the display panel in the second flat area; and a circuit board connected to the display panel in the second flat area.

In some embodiments, the window has a curved portion in which a thickness of the curved portion continuously and gradually decreases toward an edge of the window.

In some embodiments, the window includes a resin coating layer in direct contact with the polarization layer.

In some embodiments, the display device further includes a light blocking pattern on an edge of the polarization layer and covering the peripheral of the display area.

According to some embodiments of the present disclosure, there is provided a display device including: a display panel having a flat area including a display area and a bending area including a portion of a non-display area; a polarization layer attached on the flat area of the display panel and covering the flat area and a portion of the bending area adjacent to the flat area; and a window directly on the polarization layer and covering the flat area and the portion of the bending area, the window including a curved surface on the portion of the bending area.

In some embodiments, the polarization layer and the window include an edge protruding from both sides of the flat area on a plane crossing a thickness direction of the display panel and separated from the display panel, and the window includes the curved portion at the edge.

In some embodiments, the window has a curved portion in which a thickness of the curved portion continuously and gradually decreases toward an edge of the window.

In some embodiments, the window includes a resin coating layer in direct contact with the polarization layer.

In some embodiments, the display device further includes a light blocking pattern on an edge of the polarization layer and covering the peripheral of the display area.

According to some embodiments of the present disclosure, there is provided a method for manufacturing a display device, the method including: manufacturing a mold including a bottom surface and a sidewall, and defining a groove having a curved surface at least in a portion of the sidewall; preparing a display module including a display panel; forming a window including a curved portion corresponding to the curved surface of the groove by forming or placing a coating layer and at least a portion of the display module contacting the coating layer and curing the coating layer; and separating the display module including the window from the mold.

In some embodiments, the display module further includes a polarization layer provided on a surface of the display panel, and the display module is placed on the groove so that the polarization layer contacts the coating layer.

In some embodiments, the manufacturing the mold includes: preparing a substrate of a size and a shape corresponding to the sizes and shapes of the polarization layer and the window; forming the mold defining the groove of a size and a shape corresponding to the size and the shape of the substrate by applying a mold material onto a surface of the substrate and by curing; and separating the substrate from the mold.

In some embodiments, the forming the window includes: forming the coating layer by applying a coating material onto the groove; placing the display module on the groove so that a surface of the display module is in contact with the coating layer; bonding the display module and the coating layer; and forming the window by curing the coating layer.

In some embodiments, the forming the window includes: placing the display module inside the groove; forming the coating layer by applying a coating material on the display module; and forming the window by curing the coating layer.

However, effects according to the embodiments of the present disclosure are not limited to those exemplified above and various other effects are incorporated herein.

BRIEF DESCRIPTION OF THE DRAWINGS

These and/or other aspects will become apparent and more readily appreciated from the following description of the embodiments, taken in conjunction with the accompanying drawings in which:

FIGS. 17 to 21 are cross-sectional views illustrating a method for manufacturing a display device according to some embodiments of the present disclosure;

DETAILED DESCRIPTION

The present disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Features of each of various embodiments of the present disclosure may be partially or entirely combined with each other and may technically variously interwork with each other, and respective embodiments may be implemented independently of each other or may be implemented together in association with each other.

Figure 1:
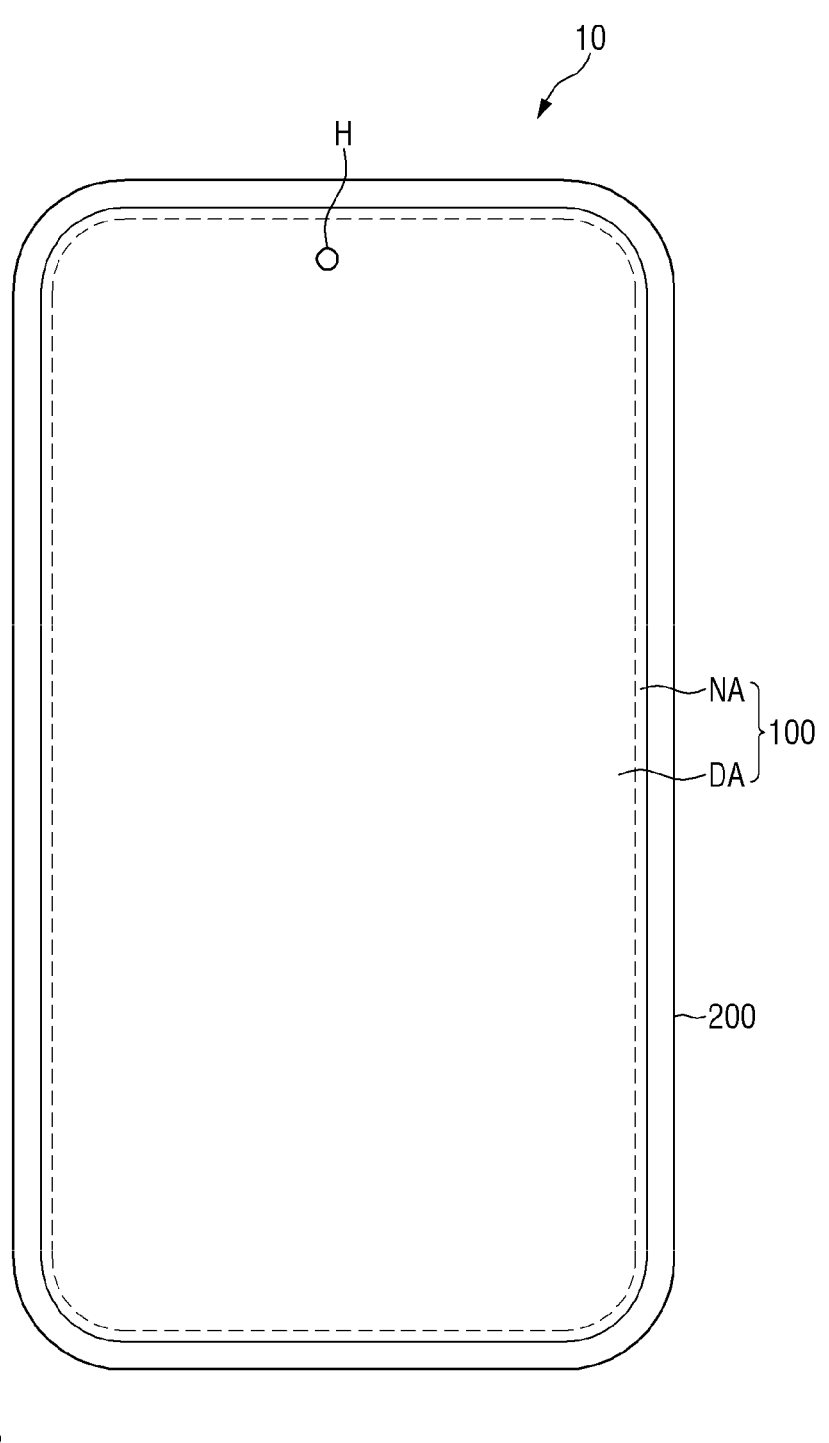
FIG. 1 is a plan view of a display device according to some embodiments of the present disclosure.

FIG. 1 is a plan view of a display device 10 according to some embodiments of the present disclosure.

Referring to FIG. 1, the display device 10 may include a display module 100. In some embodiments, the display device may further include additional component. For example, the display device 10 may include a case 200 for protecting the display module 100.

The display module 100 may include a display area DA and a non-display area NA located around the display area DA. The display area DA may include pixels for displaying an image. In some embodiments, a light-transmitting hole area H corresponding to a camera or the like (e.g., a non-pixel area in which pixels are not disposed, or a low-resolution area in which pixels are disposed in a low resolution) may be disposed in the display area DA; however, embodiments of the present disclosure are not limited thereto. The non-display area NA may be disposed on at least one side of the display area DA and partially or entirely surround the display area DA. Wires, pads, and/or at least one driving circuit electrically connected to the pixels of the display area DA may be disposed in the non-display area NA.

The case 200 may be coupled to the display module 100 to protect the display module 100 from impact applied from the outside. For example, the case 200 may be positioned on the side surface and/or the rear surface of the display device 10 to cover the side surface and/or rear surface of the display module 100.

In FIG. 1, a first direction DR1, a second direction DR2, and a third direction DR3 are defined. The first direction DR1 and the second direction DR2 may be perpendicular to each other, the first direction DR1 and the third direction DR3 may be perpendicular to each other, and the second and third directions DR2 and DR3 may be perpendicular to each other. The first direction DR1 may be a vertical direction and the second direction DR2 may be a horizontal direction; however, the present disclosure is not limited thereto. For example, the first direction DR1 may be a horizontal direction and the second direction DR2 may be a vertical direction. The third direction DR3 may be a direction crossing a plane defined by the first and second directions DR1 and DR2. For example, the third direction DR3 may be a thickness direction of the display device 10 (or an upper direction or a height direction of the display device 10).

The display device 10 may have various suitable shapes. For example, the display device 10 may have a substantially rectangular shape on a plane defined by the first and second directions DR1 and DR2. For example, the display device 10 may include two first sides extending in the first direction DR1 and two second sides extending in the second direction DR2 on a plane. In some embodiments, the first side may be longer than the second side; however, embodiments of the present disclosure not limited thereto.

The display device 10 may have angled corners or rounded corners. For example, a corner where the first side and the second side of the display device 10 meet may form a right angle or a curved surface.

The planar shape of the display device 10 is not limited to the example, and may be modified to a circular shape, an elliptical shape, or other shapes. In addition, although some embodiments in which the display surface of the display device 10 including the display area DA is illustrated to be flat in FIG. 1, the embodiments are not limited thereto. For example, the display surface of the display device 10 may include a curved surface in at least one portion.

Figure 2:
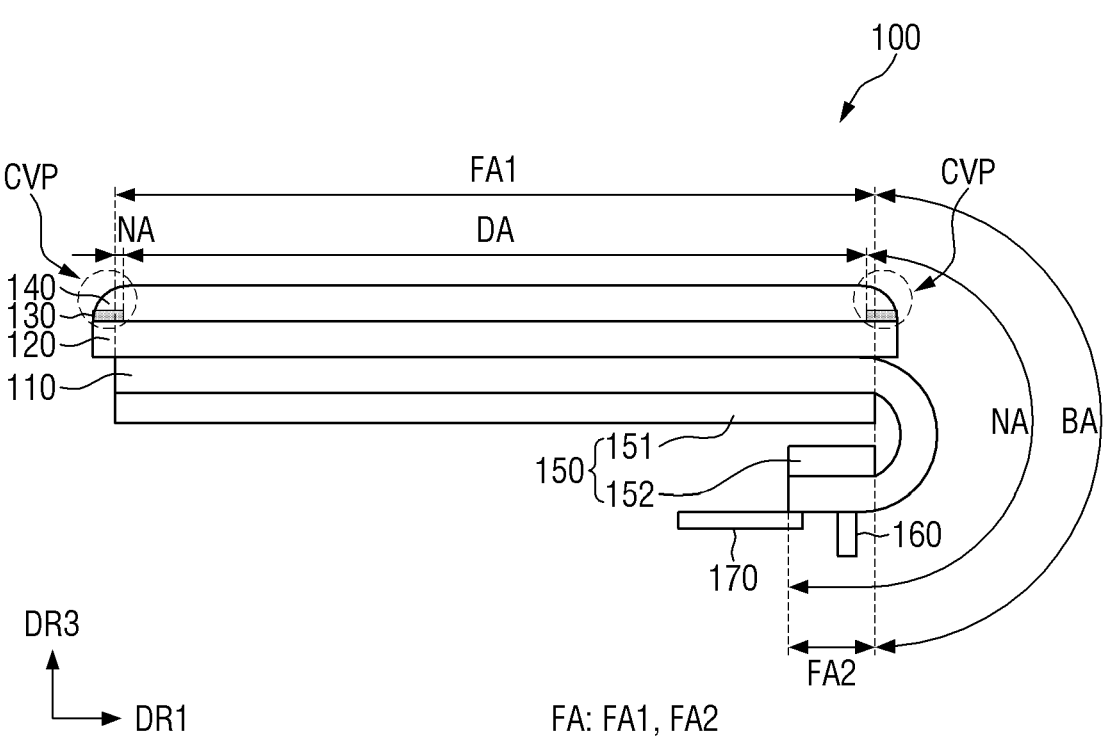
FIGS. 2 and 3 are cross-sectional views illustrating display modules according to some embodiments of the present disclosure.
Figure 3:
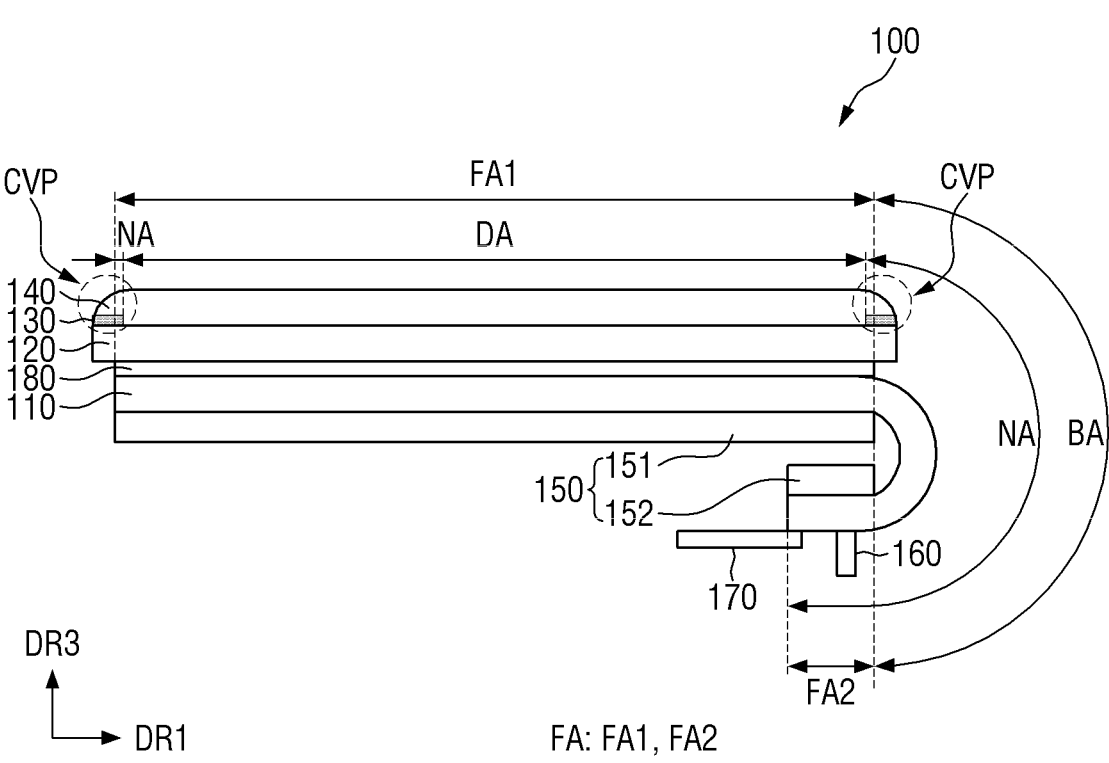

FIGS. 2 and 3 are cross-sectional views illustrating display modules 100 according to some embodiments of the present disclosure. In comparison to the display module 100 according to the embodiments of FIG. 2, the display module 100 according to the embodiments of FIG. 3 may further include an adhesive layer 180.

Figure 4:
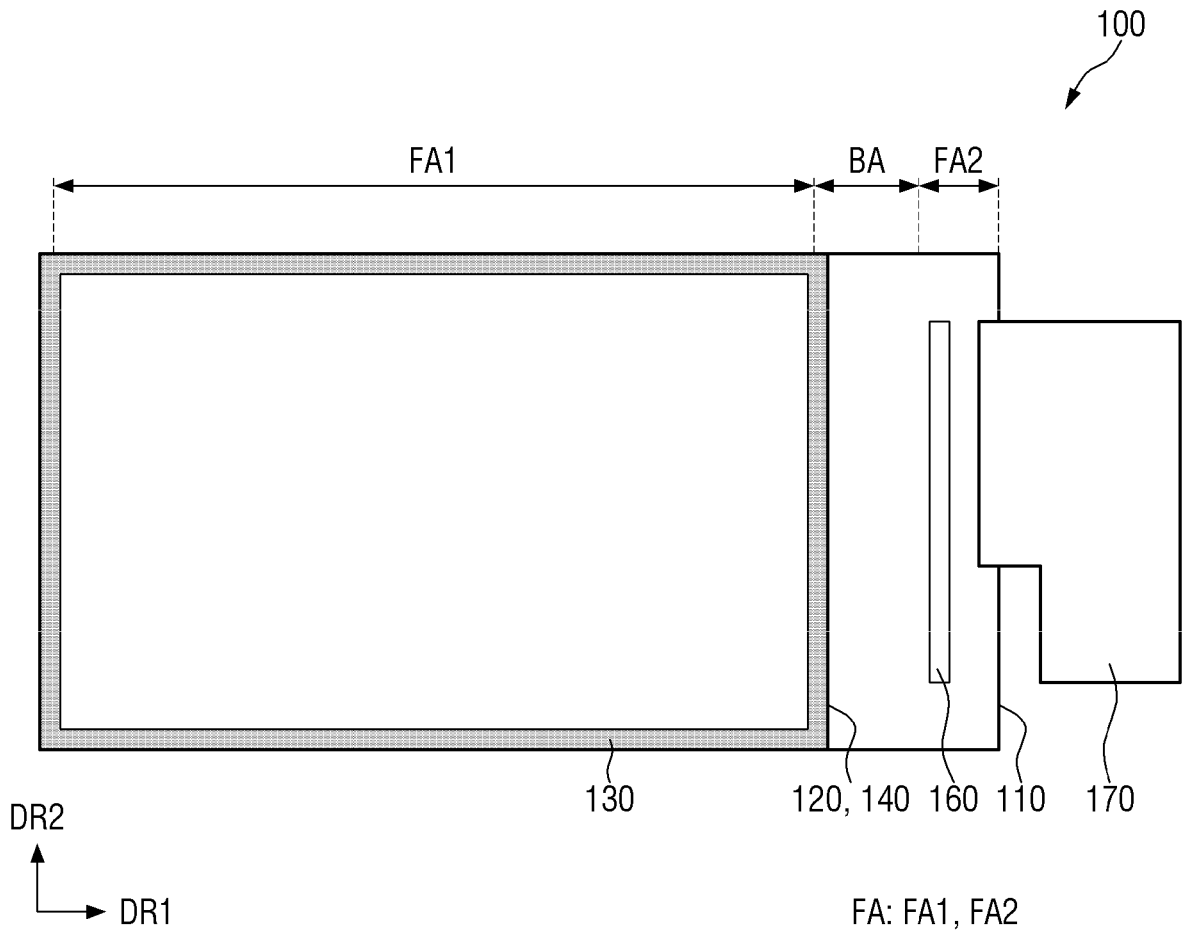
FIG. 4 is a plan view of a display module according to some embodiments of the present disclosure.

FIG. 4 is a plan view of the display module 100 according to some embodiments of the present disclosure. For example, FIG. 4 is a plan view schematically illustrating a state in which the display modules 100 according to the embodiments of FIGS. 2 and 3 are unfolded without bending.

Figure 5:
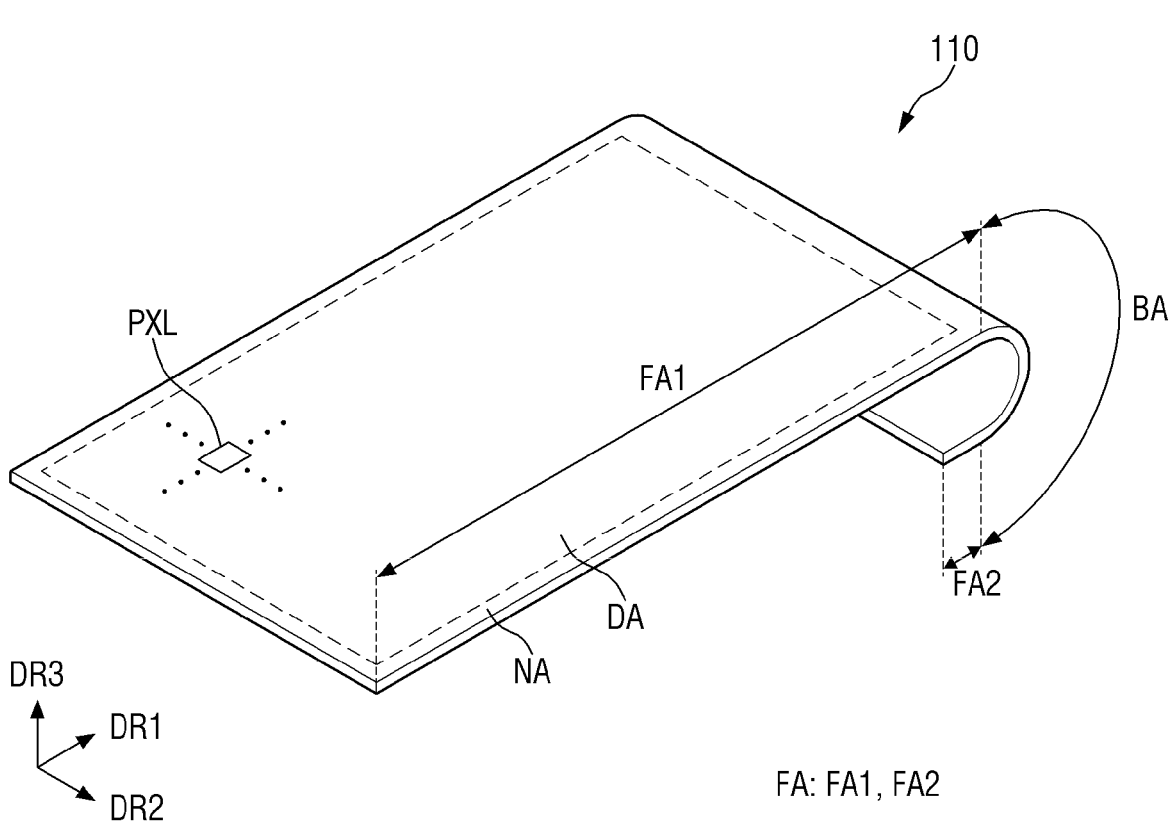
FIG. 5 is a perspective view of a display panel according to some embodiments of the present disclosure.

FIG. 5 is a perspective view of a display panel 110 according to some embodiments of the present disclosure. For example, FIG. 5 schematically illustrates the display panels 110 illustrated in FIGS. 2 and 3 in a bent state.

Referring to FIGS. 2 to 5 in addition to FIG. 1, the display module 100 may include a display panel 110 constituting a panel portion of the display device 10, a polarization layer 120 and a window 140. In some embodiments, the panel portion of the display device 10 further includes a cover panel 150.

In some embodiments, the display module 100 further includes additional components. For example, the display module 100 may further include a light blocking pattern 130 surrounding the display area DA, a driving circuit 160 electrically connected to the display panel 110 in the non-display area NA, and a circuit board 170 (e.g., flexible circuit board). The driving circuit 160 and the circuit board 170 may constitute a driver of the display device 10.

The display panel 110 may include a display area DA and a non-display area NA, and may include pixels PXL in the display area DA. The display panel 110 may display arbitrary visual information, for example, text, video, photo, 2D or 3D image, and the likes, using the pixels PXL. Hereinafter, arbitrary visual information is referred to as an "image". In the present disclosure, the type, structure and/or shape of the display panel 110 is not particularly limited. For example, the display panel 110 may be a self-luminous display panel such as an organic light emitting display panel (OLED panel), or a non-emissive display panel such as a liquid crystal display panel (LCD panel), an electro-phoretic display panel (EPD panel) and an electro-wetting display panel (EWD panel). When a non-emissive display panel is used as the display panel 110 of the display device 10, the display device 10 may include a light source unit (e.g., backlight unit) for supplying light to the display panel 110.

In some embodiments, the display panel 110 may include a substrate (or base member), a pixel circuit layer and a light emitting element layer provided on the substrate, and an encapsulation layer and/or a protective layer covering the light emitting element layer. The pixel circuit layer may include circuit elements constituting the pixel circuits of the pixels PXL and wires connected thereto. The light emitting element layer may include light emitting elements of the pixels PXL. This assumes that the display panel 110 is a light emitting display panel, and in examples where the display panel 110 is a display panel of a different type and/or structure, the configuration and/or structure of the display panel 110 may be modified.

In some embodiments, the display panel 110 further includes a sensor layer or is integrally manufactured with a sensor. For example, the display panel 110 may include at least one type of sensor, such as a touch sensor, and may use the sensor to sense a user's touch input.

In some embodiments, the display panel 110 includes a substantially flat area FA and a bending area BA extending from the flat area FA, and is accommodated in the case 200 in a bent state in the bending area BA. In describing the embodiments, the term "extension" may comprehensively mean extending, expanding, protruding, or continuously being disposed while being integrally connected or formed. In addition, in describing the embodiments, the term "bent"

or "bending" may comprehensively mean that the shape is not fixed but is transformed from an original shape to another shape. For example, the "bent state" may include a folded state, a curved state, or a rolled state.

The flat area FA and the bending area BA may be set based on the display panel 110. For example, the flat area FA and the bending area BA may be determined according to whether the display panel 110 is bent or not and based on the location of the display panel 110.

The display panel 110 may include a display area DA where the pixels PXL are located and a non-display area NA excluding the display area DA (e.g., outside of and at least partially surrounding the display area DA). FIGS. 2 to 5 illustrate some embodiments in which the bending area BA is provided in the non-display area NA; however, embodiments of the present disclosure are not limited thereto. For example, a portion of the display area DA may be located in the bending area BA.

Including FIGS. 2 and 3, in the drawings which show the display area DA and the non-display area NA, the display area DA and the non-display area NA are defined in reference to the display panel 110. Even when it is not indicated as the non-display area NA in the drawings, the area where the display panel 110 is not provided (e.g., the left end area of the window 140 and the polarization layer 120 overlapping the light blocking pattern 130 in FIGS. 2 and 3) may be a non-display area NA.

In some embodiments, a first surface (e.g., an upper surface or a front surface) of the display panel 110 may be set as a display surface for displaying an image, and the display panel 110 may be disposed such that the first surface thereof faces upward. Also, the display panel 110 may be bent in the bending area BA. For example, the display panel 110 may have flexibility as a whole or may have flexibility in at least the bending area BA, and may be folded, bent, or rolled in the bending area BA.

In some embodiments, the flat area FA may include a first flat area FA1 and a second flat area FA2 spaced apart from the first flat area FA1, with the bending area BA interposed therebetween. The second flat area FA2 may face the first flat area FA1 with the bending area BA therebetween in a state in which the display panel 110 is bent. For example, the second flat area FA2 may extend at an angle relative to or be parallel to the first flat area FA1. In some examples, the display panel 110 may be bent in the bending area BA such that the second surface (e.g., the lower surface or the rear surface) of the first flat area FA1 faces the second surface of the second flat area FA2. As the display panel 110 is bent, the width of the non-display area NA recognized by the user may be reduced.

The first flat area FA1 may include the display area DA. In some embodiments, the first flat area FA1 further includes a portion of the non-display area NA. For example, the first flat area FA1 may further include a portion of the non-display area NA directly adjacent to the display area DA.

The bending area BA may extend from the first flat area FA1. In some embodiments, the bending area BA may include another portion of the non-display area NA.

The second flat area FA2 may extend from the bending area BA. In some embodiments, the second flat area FA2 may include the remaining portion of the non-display area NA. In some embodiments, the driving circuit 160 and the circuit board 170 is disposed on the first surface of the second flat area FA2.

The polarization layer 120 and the window 140 may be disposed on the display panel 110. For example, the polarization layer 120 and the window 140 may be sequentially disposed on the first surface of the display panel 110.

The polarization layer 120 may include a polarizer for controlling or changing light emitted from the display panel 110. For example, the polarization layer 120 may polarize light emitted from the display panel 110 along a polarization axis.

In some embodiments, the polarization layer 120 is disposed on at least one portion of the display panel 110 to cover the display area DA and a portion of the non-display area NA adjacent to the display area DA. For example, the polarization layer 120 may be disposed on the display panel 110 to cover the first flat area FA1 and a portion of the bending area BA adjacent to the first flat area FA1.

In some embodiments, the polarization layer 120 is attached to the display panel 110 in the first flat area FA1 and may not be attached to the display panel 110 and may be separated in the bending area BA. For example, as shown in FIG. 3, the display module 100 may include an adhesive 180 provided on the first surface of the display panel 110 in the first flat area FA1, and the display panel 110 and the polarization layer 120 may be combined via the adhesive 180. Accordingly, while stably fixing the polarization layer 120 on the display panel 110, the display panel 110 may be appropriately and/or freely bent in the bending area BA.

In some embodiments, the light blocking pattern 130 is disposed or provided on the edge of the polarization layer 120. For example, the light blocking pattern 130 may have an opening exposing the display area DA and may cover the non-display area NA around the display area DA. For example, the light blocking pattern 130 may be disposed on one surface (e.g., the upper surface or the front surface) of the polarization layer 120 to cover the non-display area NA located at the edge of the polarization layer 120. In this case, the light blocking pattern 130 may be positioned between the polarization layer 120 and the window 140 in the non-display area NA.

In some embodiments, the light blocking pattern 130 is directly printed on one surface of the polarization layer 120. Accordingly, the printing precision of the light blocking pattern 130 can be increased, and the light blocking pattern 130 can be formed more clearly and more precisely.

The window 140 may protect the display module 100 from external impact and provide an input surface and/or a display surface to the user. In some embodiments, the window 140 is disposed or formed directly on the polarization layer 120 so as to contact the polarization layer 120. For example, the window 140 may be formed in close contact with the polarization layer 120 without a separate adhesive member so as to directly contact the polarization layer 120 in at least the display area DA.

In some embodiments, the window 140 has substantially the same area as the polarization layer 120 and substantially completely overlap the polarization layer 120. Here, "substantially" refers to the allowable error range that may occur in the process, and as an example, "substantially the same" may mean the same within an allowable error range that may occur in the process, and "substantially completely overlap" may mean overlapping within an allowable error range that may occur in the process.

With the polarization layer 120, the window 140 may cover the display area DA and a portion of the non-display area NA adjacent to the display area DA. For example, the window 140 may be disposed on the polarization layer 120 to cover the first flat area FA1 and a portion of the bending area BA adjacent to the first flat area FA1.

In some embodiments, the window 140 is a coating layer formed directly on the polarization layer 120 or includes the coating layer. For example, the window 140 may include a resin coating layer that directly contacts the polarization layer 120.

The window 140 may include a curved portion CVP. For example, the window 140 may include the curved portion CVP at an edge, and a portion of the curved portion CVP may be located on a portion of the bending area BA (for example, a portion of the bending area BA adjacent to the first flat area FA1) of the display panel 110. The location of the curved portion CVP of the window 140 is not limited thereto, and may vary as may be suitable.

In some embodiments, the curved portion CVP of the window 140 is positioned on a portion of the non-display area NA. For example, the window 140 may be formed to be flat while having a substantially uniform thickness or height in most areas including the display area DA, and may include a curved portion CVP having a curved surface in which the thickness continuously and gradually decreases from the edge surrounding the display area DA (for example, an area corresponding to a portion of the non-display area NA adjacent to the display area DA). For example, the window 140 may be a 2.5D contour window.

In some embodiments, the window 140 is directly formed to include the curved portion CVP from a step of forming a coating layer for forming the window 140. In addition, the window 140 may be formed in close contact with one surface of the display module 100 including the polarization layer 120 while including the curved portion CVP. Accordingly, the window 140 including the smooth curved portion CVP can be manufactured without going through an additional processing process (for example, a laser cutting or chamfering process) to refine the shape of the window 140. Accordingly, the window 140 of excellent quality (for example, having a smooth surface in terms of surface roughness and excellent surface characteristics, such as little or substantially no foreign matter in terms of surface roughness) and a display device 10 including the window 140 may be provided.

In some embodiments, the polarization layer 120 and the window 140 extend in the opposite direction (e.g., the left direction or the opposite direction of the first direction DR1 in FIGS. 2 and 3) of the bending area BA on a plane (e.g., a plane defined by the first direction DR1 and the second direction DR2) crossing the thickness direction (e.g., the third direction DR3) of the display panel 110, and protrude more outward from the display panel 110. For example, the polarization layer 120 and the window 140 may protrude from both sides of the first flat area FA1 of the display panel 110 on a plane crossing the thickness direction of the display panel 110 and include an edge separated from (e.g., extending out from) the display panel 110. Accordingly, the polarization layer 120 and the window 140 can more stably protect the display panel 110. In some embodiments, the window 140 includes a curved portion CVP at the edge, and has a 2.5D contour formed as a curved surface with a smooth edge.

A cover panel 150 may be disposed below the display panel 110. For example, the cover panel 150 may be disposed or provided on a second surface (e.g., a lower surface or a rear surface) of the display panel 110 on which an image is not displayed. The cover panel 150 may protect the display panel 110 from external impact.

In some embodiments, the cover panel 150 is provided in the flat area FA and is not provided in the bending area BA. For example, the cover panel 150 may be disposed on the second surface (e.g., the surface opposite to the display surface) of the display panel 110 in the first flat area FA1 and the second flat area FA2. For example, the cover panel 150 may include a first cover panel 151 attached to the first flat area FA1 of the display panel 110 and a second cover panel 152 attached to the second flat area FA2 of the display panel 110, and the first cover panel 151 and the second cover panel 152 may be spaced apart with the bending area BA interposed therebetween. In some other embodiments, the cover panel 150 has an opening corresponding to the bending area BA, and the first cover panel 151 and the second cover panel 152 may be connected to each other while passing through a portion of the bending area BA.

In some embodiments, the cover panel 150 functions to mitigate external impact and includes a cushion layer including a material capable of elastic deformation. For example, the cover panel 150 may include a cushion layer including at least one material of thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicone, combinations thereof, and/or other appropriate material. In addition, the cover panel 150 may further include a high-strength plate (e.g., a metal plate), graphite, a copper plate, and/or a heat radiation plate, selectively, on the rear surface of the display panel 110 to stably support the display panel 110.

In some embodiments, the driving circuit 160 and/or the circuit board 170 is provided or disposed on the non-display area NA of the display panel 110. For example, the driving circuit 160 may be provided or disposed on the second flat area FA2 of the display panel 110 and electrically connected to the pixels PXL. The circuit board 170 may be connected to the display panel 110 at one side of the second flat area FA2 of the display panel 110. The circuit board 170 may be electrically connected to the driving circuit 160 and/or the pixels PXL. The driving circuit 160 and the circuit board 170 may generate or transfer driving signals and/or power voltages for driving the pixels PXL of the display panel 110.

In some embodiments, elements such as the driving circuit 160 and the circuit board 170 that improve (e.g., maximize) space efficiency and do not need to be visually recognized by the user are placed on the lower surface side of the display module 100 when the display panel 110 is being bent. For example, the driving circuit 160 and the circuit board 170 may be disposed on the first surface of the display panel 110 in the second flat area FA2, and be disposed to face the lower portion of the display module 100 when the display panel 110 is being bent.

FIGS. 6 to 16 are cross-sectional views illustrating a method for manufacturing a display device 10 according to some embodiments of the present disclosure. For example, FIGS. 6 to 16 illustrate manufacturing steps for forming an integral window 140 in a sequential order in relation to the display module 100 which is the main component of the display device 10.

Figure 6:
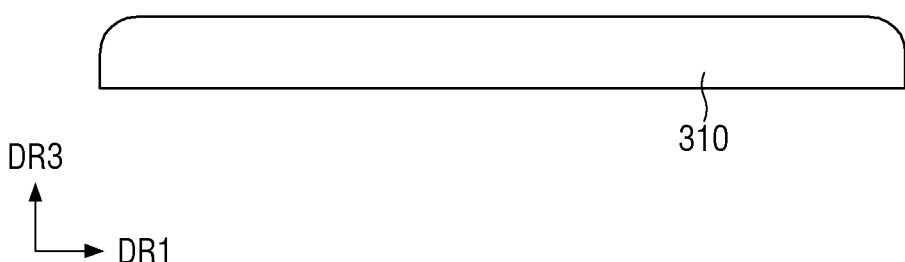
FIGS. 6 to 16 are cross-sectional views illustrating a method for manufacturing a display device according to some embodiments of the present disclosure.

Referring further to FIG. 6 in addition to FIGS. 1 to 5, first, a substrate 310 corresponding to the polarization layer 120 and the window 140 of the display module 100 to be manufactured is prepared. For example, the substrate 310 having a size and shape corresponding to the sizes and shapes of the polarization layer 120 and the window 140 may be prepared. The substrate 310 may have a curved surface corresponding to the curved portion CVP of the window 140 to be manufactured. For example, substrate 310 may be a 2.5D contoured substrate. In some embodiments, the substrate 310 may be a glass substrate; however, embodiments of the present disclosure are not limited thereto.

Figure 7:
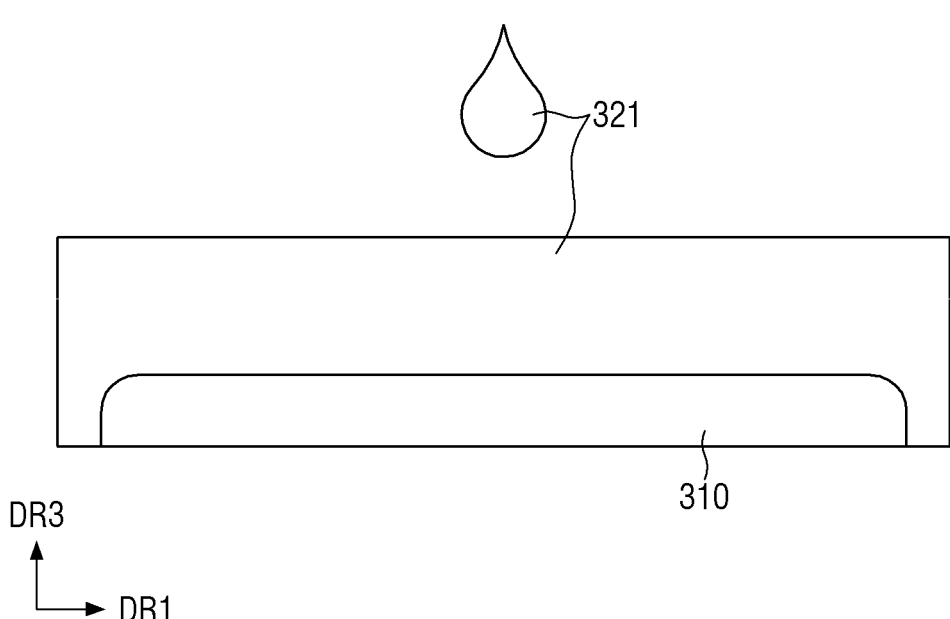

Referring to FIG. 7 in addition to FIGS. 1 to 6, a mold material 321 (e.g., a mold material used as a material for molding) may be applied to the surface of the substrate 310. In some embodiments, the mold material 321 is a transparent material through which light (e.g., ultraviolet rays) used for curing the mold material 321 in a subsequent process may pass. For example, the mold material 321 may include at least one of polydimethylsiloxane (hereinafter, referred to as "PDMS") or other silicon-based light-transmitting polymer resins; however, embodiments of the present disclosure are not limited thereto. In some embodiments, the mold material 321 applied to the surface of the substrate 310 is leveled (e.g., flattened) to have a more flat surface.

Figure 8:
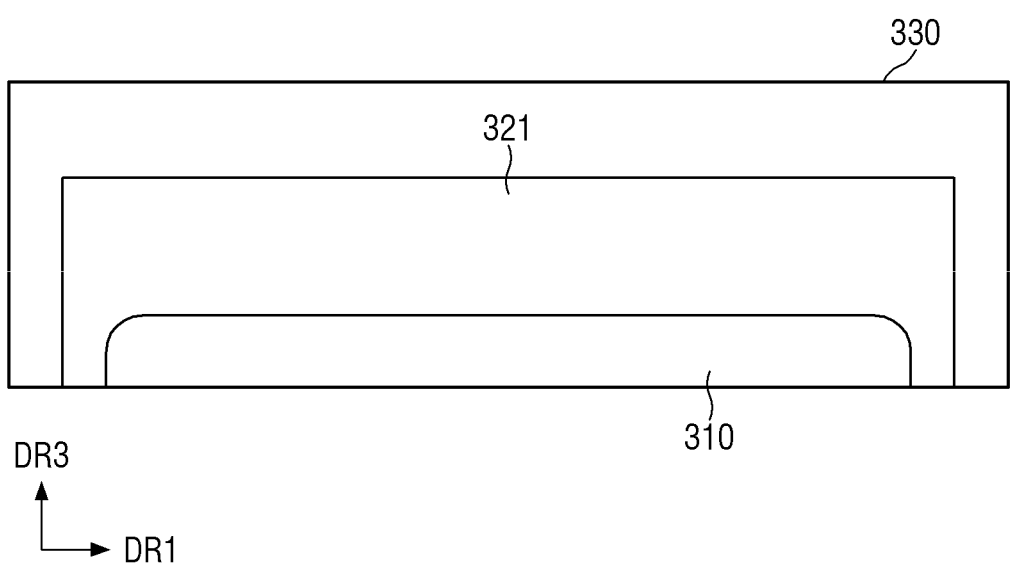

Referring to FIG. 8 in addition to FIGS. 1 to 7, the substrate 310 coated with the mold material 321 may be disposed in a vacuum chamber 330, and a process in which the mold material 321 is compressed (or bonded) on the substrate 310 under vacuum conditions may be implemented. Accordingly, air bubbles generated when the mold material 321 is applied may be removed, and an oxidation reaction of the mold material 321 may be substantially reduced, prevented, or suppressed. In some embodiments, the vacuum condition may be a process condition set by applying an experimental value (e.g., a vacuum pressure of about 10 Pa) that is set (e.g., optimized) to increase the strength of the mold material 321. For example, the vacuum condition may be an experimentally determined process condition such that the modulus, tensile, and/or tear strength of a mold (e.g., the mold 320 of FIG. 9) to be manufactured using the mold material 321 may be equal to or greater than the target value.

Figure 9:
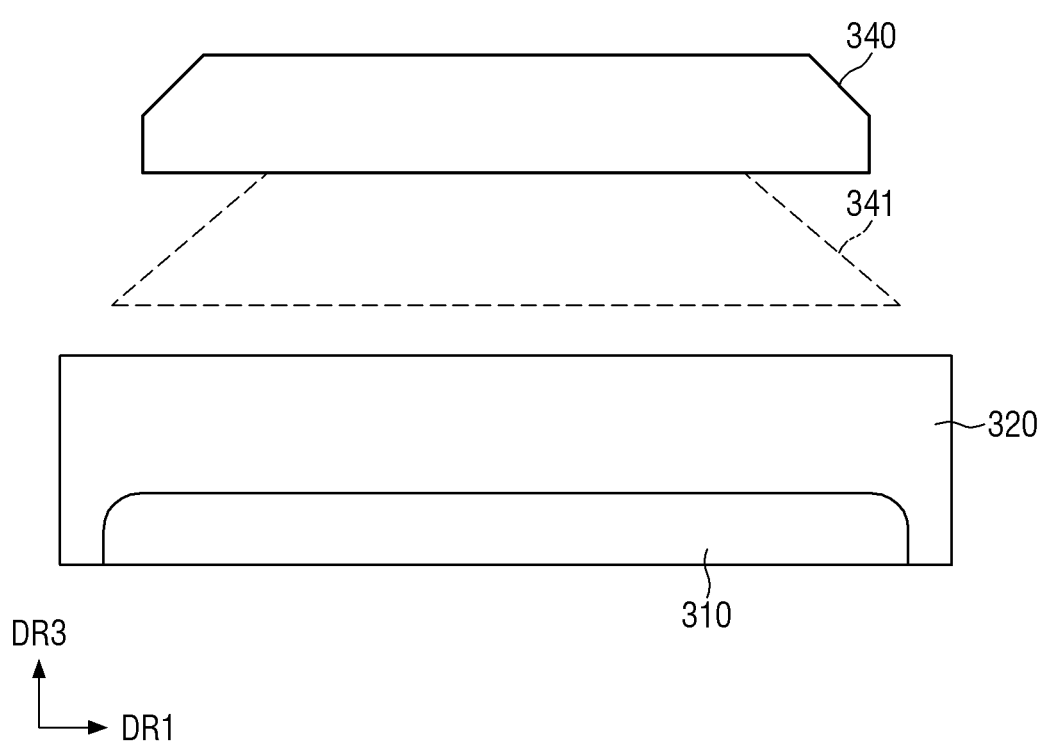

Referring to FIG. 9 in addition to FIGS. 1 to 8, the mold 320 (or a molding frame) may be formed or manufactured by curing the mold material 321. For example, the mold material 321 may be thermally cured by applying heat 341 to the mold material 321 using a thermal curing device 340 such as a heating chamber. Accordingly, the mold 320 may be formed.

In some embodiments, the mold material 321 may be thermally cured at low temperatures at a set or predetermined appropriate temperature. For example, the mold material 321 may be thermally cured at low temperatures at a set or predetermined appropriate temperature (e.g., about 40° C.) experimentally set so that the shrinkage rate of the mold material 321 may be less than a target value (e.g., 0.7%) when curing the mold material 321. The method of curing the mold material 321 is not limited thereto, and may be modified in a suitable manner.

In some embodiments, the modulus of the mold 320, which is lowered by low-temperature thermal curing, improved (e.g., increased) by adjusting the composition of the mold material 321. For example, the modulus of the mold 320 may be increased by increasing the ratio of the base monomer of PDMS used as the mold material 321.

Figure 10:
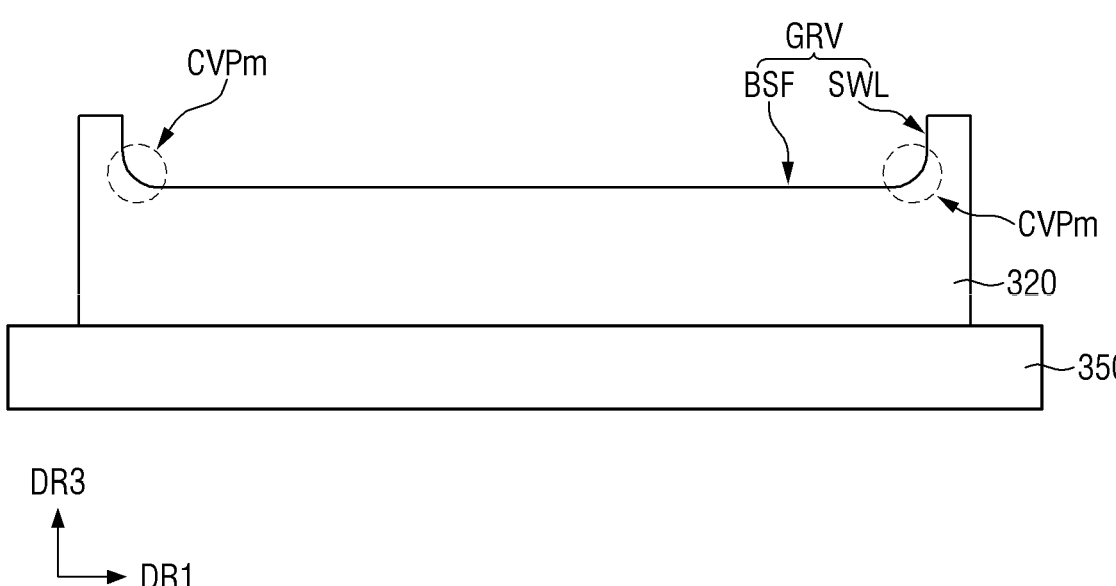

Referring to FIG. 10 in addition to FIGS. 1 to 9, by separating the substrate 310 and the mold 320, the mold 320 including a groove GRV having a size and shape corresponding to the substrate 310 may be manufactured. The mold 320 manufactured by the manufacturing steps of FIGS. 6 to 10 may be attached to a support member 350.

The groove GRV of the mold 320 includes a bottom surface BSF and side walls SWL, and may have a curved portion CVPm corresponding to the curved surface of the substrate 310 in at least a portion of the side wall SWL. For example, the groove GRV may include a curved portion CVPm having a gradual and smooth curved surface in a region extending from the bottom surface BSF to the side wall SWL.

The support member 350 may be a member having sufficient strength and durability to prevent the mold 320 from being deformed or to substantially reduce deformation thereof in a subsequent process. For example, the support member 350 may be a glass substrate; however, embodiments of the present disclosure are not limited thereto.

In some embodiments, the hydrophobic property of the mold 320 may be increased by treating the surface of the mold 320 using fluorine. Accordingly, in a subsequent process, the adhesive force between the window 140 formed on the mold 320 and the mold 320 may be lowered, and the display module 100 and the mold 320 may be more smoothly or easily separated.

Figure 11:
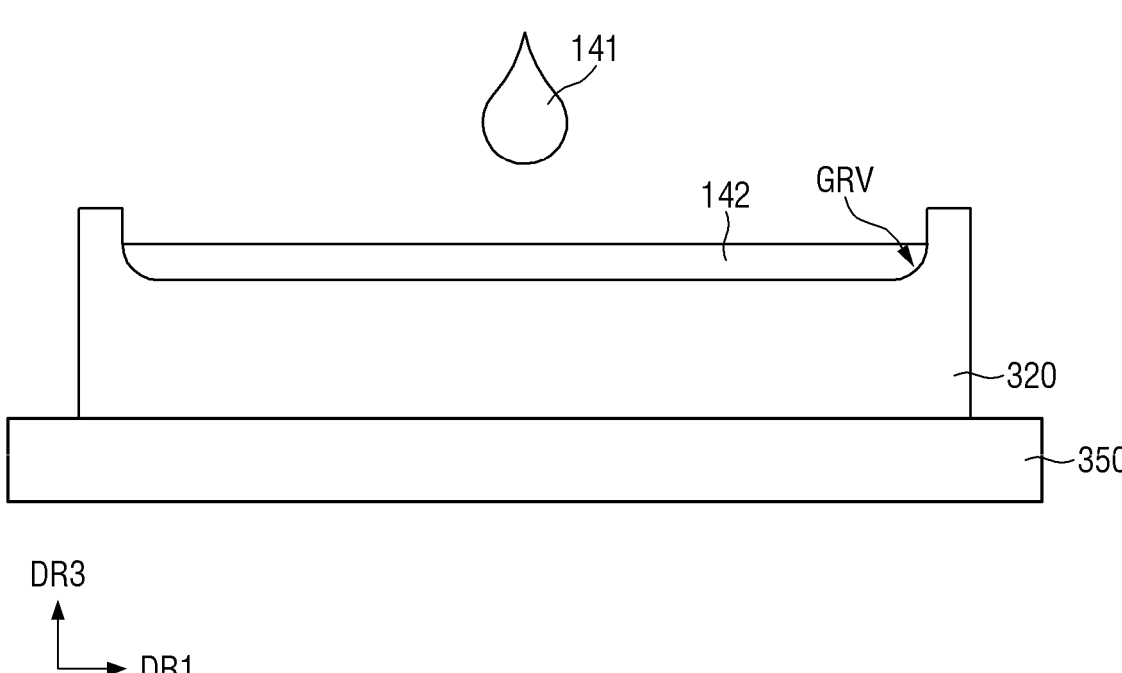

Referring to FIG. 11 in addition to FIGS. 1 to 10, a coating layer 142 may be formed by applying a coating material 141 on the groove GRV (or inside the groove GRV) of the mold 320. The coating layer 142 may be formed to have an appropriate thickness and/or height in consideration of the thickness of the window 140 to be manufactured, and may have a shape corresponding to the groove GRV. For example, the coating layer 142 may be formed to have a thickness corresponding to the sum of the thickness of the window 140 to be manufactured and the amount of thickness variation (e.g., thickness reduction) of the coating layer 142 that may occur in the process step, and may have a curved surface corresponding to the curved portion CVPm of the groove GRV.

In some embodiments, the coating material 141 is a resin, and the coating layer 142 is a resin coating layer. The type of coating material 141 is not limited thereto, and the coating material 141 may be modified to be formed of another material suitable for forming the window 140.

Figure 12:
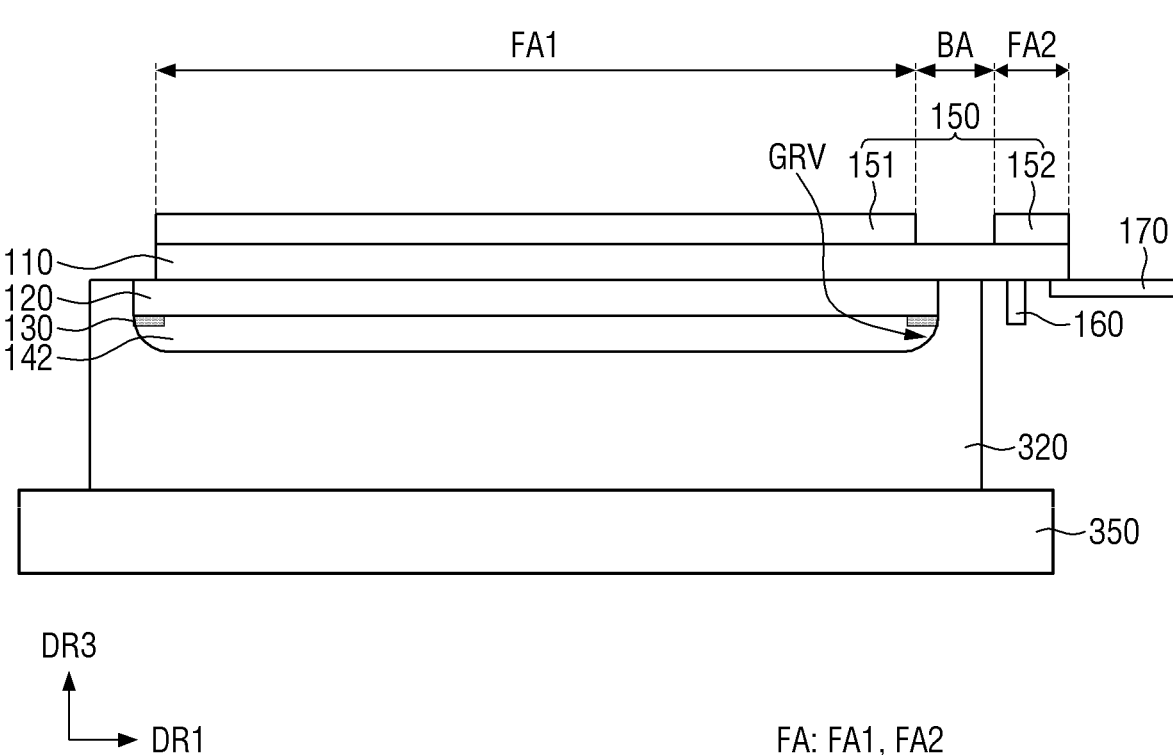

Referring to FIG. 12 in addition to FIGS. 1 to 11, the display module 100 including the display panel 110 may be prepared, and at least a portion of the display module 100 may be formed on the groove GRV (or inside the groove GRV) of the mold 310. For example, the display module 100 including the display panel 110, the polarization layer 120 and the light blocking pattern 130 provided on the first surface of the display panel 110, and the cover panel 150 provided on the second surface of the display panel 110 may be arranged on the mold 320, and the display module 100 may be disposed on the groove GRV so that one surface of the display module 100 is in contact with the coating layer 142. For example, after arranging the display module 100 on the mold 320 so that the polarization layer 120 faces the coating layer 142, the display module 100 may be disposed on the groove GRV so that the polarization layer 120 is in contact with the coating layer 142. The display module 100 in the manufacturing step of FIG. 12 may not include the window 140, and after the window 140 is integrally manufactured with the display module 100 by the coating layer 142 in a subsequent process, the display module 100 may further include a window 140.

In some embodiments, the coating layer 142 completely overlaps with the polarization layer 120 and the light blocking pattern 130 in order to cover one surface (e.g., the surface contacting the coating layer 142 in FIG. 12, which is one surface positioned at the display surface side of the display module 100). Accordingly, the window 140 manufactured as the coating layer 142 is cured in a subsequent process may completely cover one side of the polarization layer 120 and the light blocking pattern 130.

Figure 13:
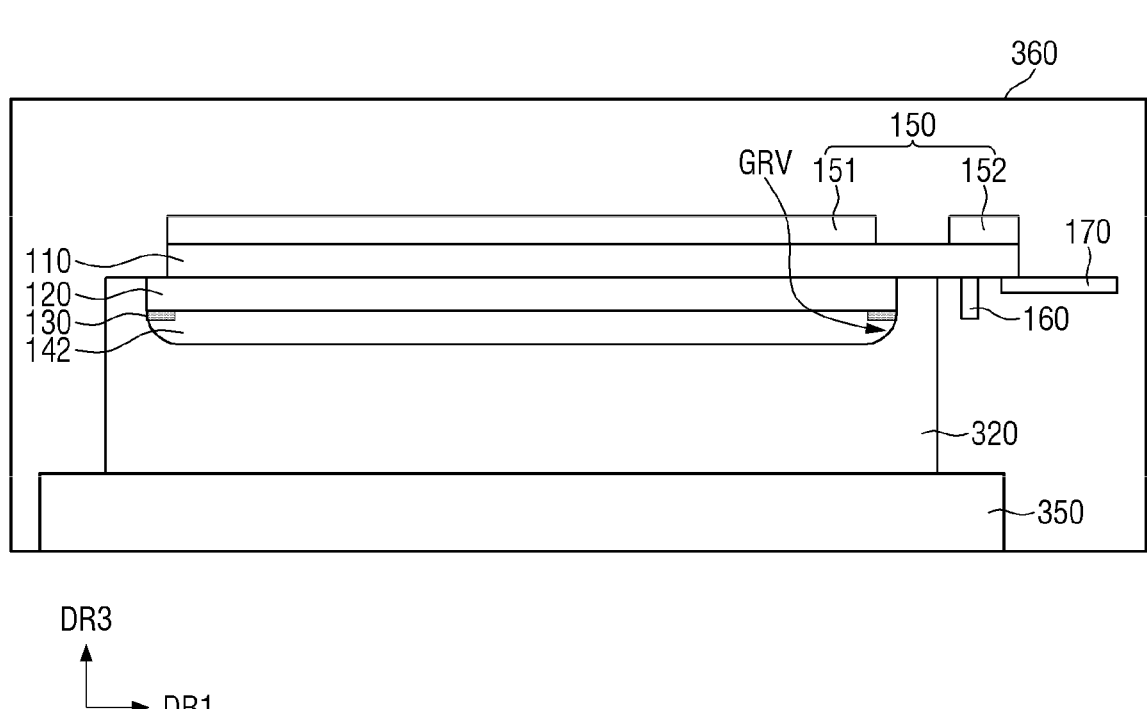

Referring to FIG. 13 in addition to FIGS. 1 to 12, the mold 320 on which the coating layer 142 and the display module 100 are seated on the groove GRV may be disposed in a vacuum chamber 360, and the coating layer 142 and the display module 100 may be bonded (or compressed) under a vacuum condition. Accordingly, air bubbles generated in the process of forming the coating layer 142 by applying the coating material 141 may be removed, and bonding strength (or adhesive force) between the coating layer 142 and the display module 100 may be increased. A method of bonding the coating layer 142 and the display module 100 is not limited to the above-described embodiment. For example, the coating layer 142 and the display module 100 may be bonded using an autoclave.

Figure 14:
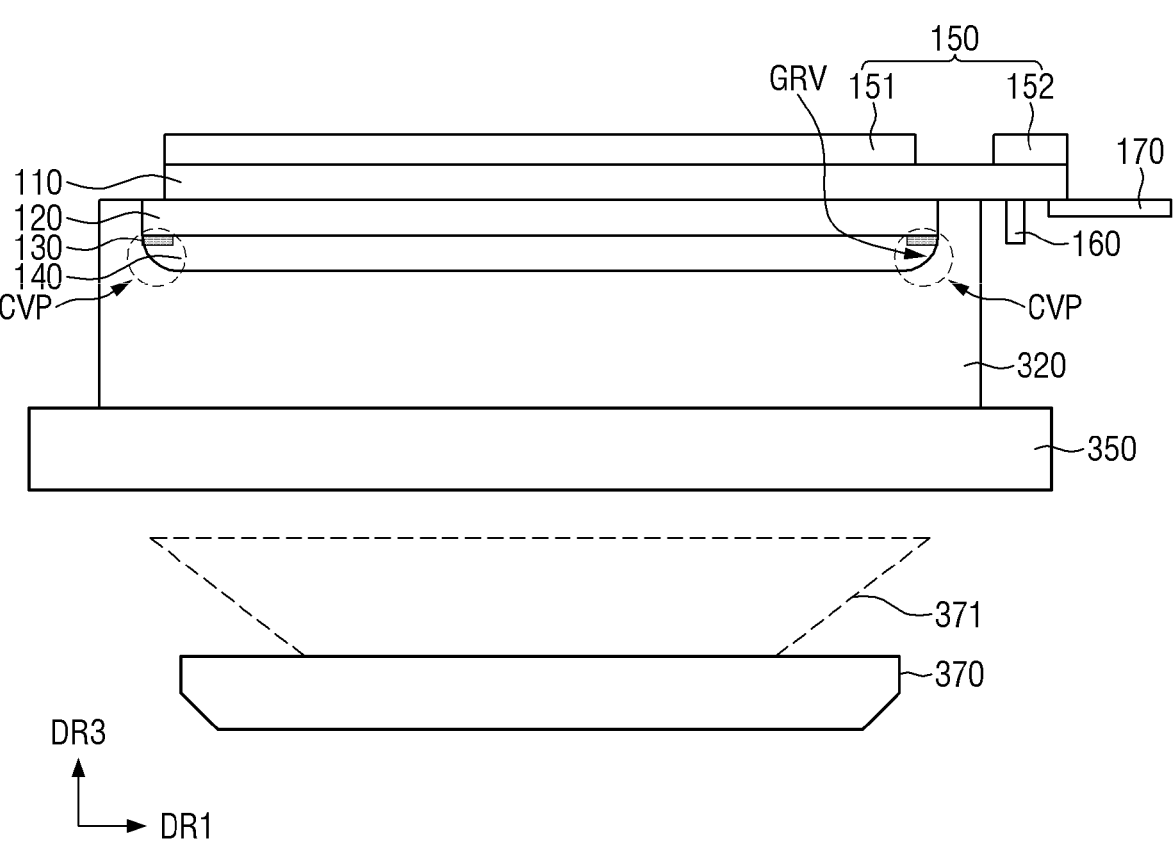

Referring to FIG. 14 in addition to FIGS. 1 to 13, the window 140 may be formed by curing the coating layer 142. For example, the coating layer 142 may be photocured using a photocuring device 370 that irradiates light 371 such as ultraviolet rays. For example, when the light 371 irradiated from the photocuring device 370 can pass through the mold 320 and the support member 350 (for example, when light transmittance of the mold 320 and the support member 350 in respect to the light 371 (e.g., ultra rays) irradiated from the photocuring device 370 is approximately 80% or more), the photocuring device 370 may be disposed on the lower portion of the support member 350, and the mold 320 and the coating layer 142 may be cured by irradiating light 371 to the coating layer 142 from the lower portion of the support member 350. Accordingly, the coating layer 142 may be cured to form the window 140. The window 140 manufactured by the manufacturing steps of FIGS. 11 to 14 may include the curved portions CVP corresponding to the curved surfaces of the groove GRV of the mold 320, and may be integrally formed with the display module 100.

Figure 15:
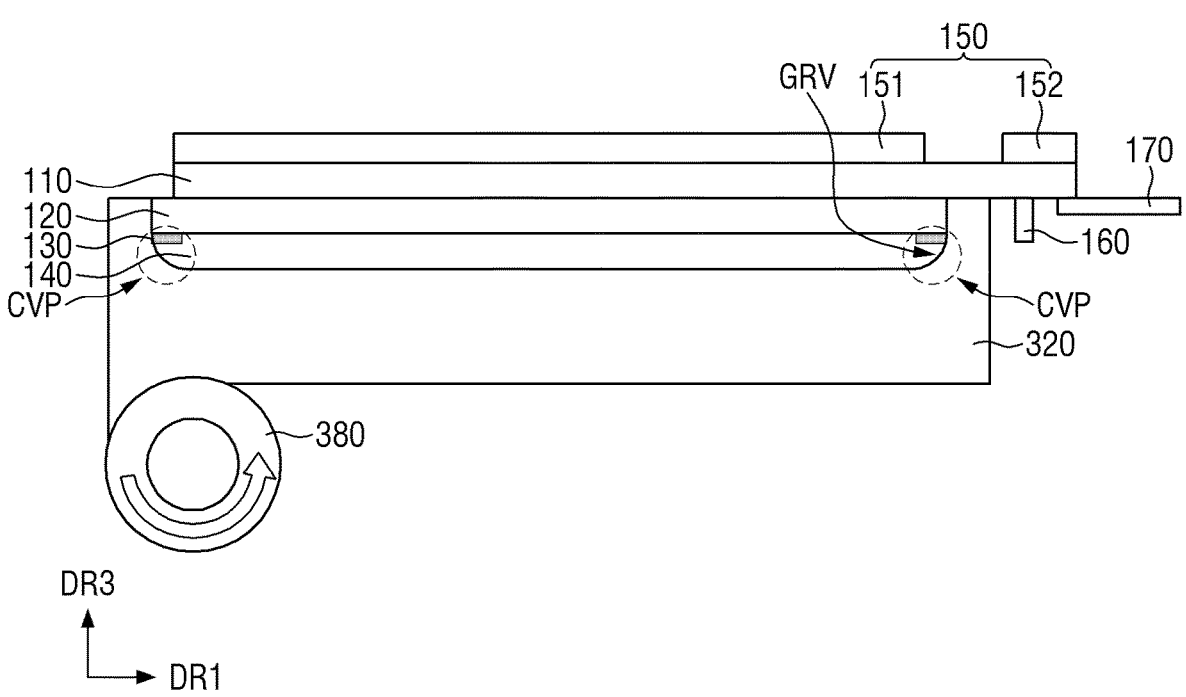
Figure 16:
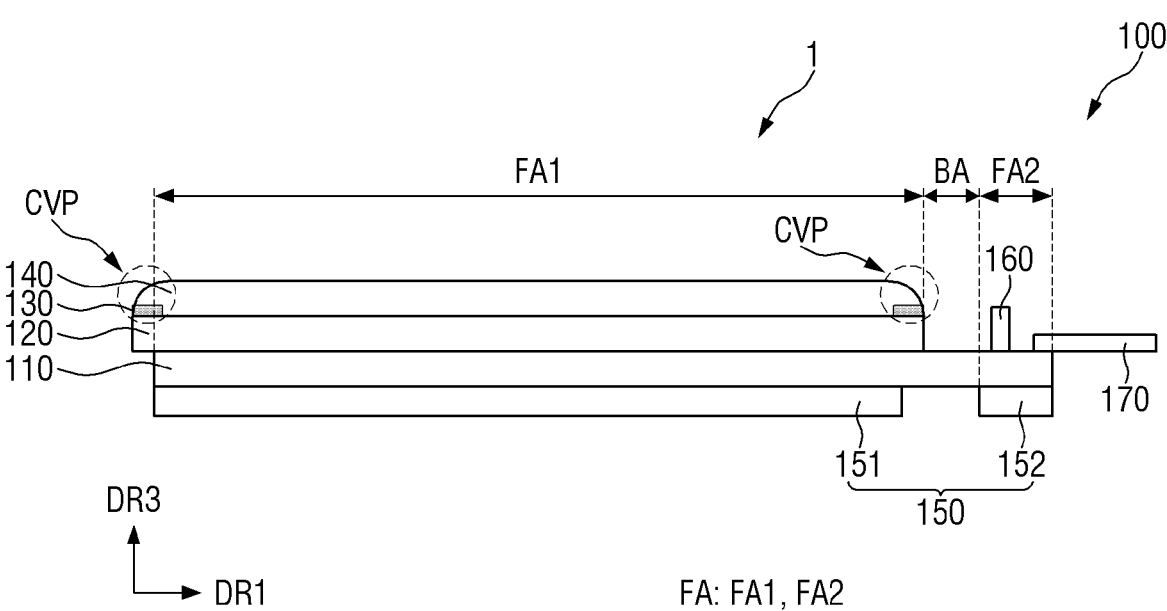

Referring to FIGS. 15 and 16 in addition to FIGS. 1 to 14, the display module 100 including the window 140 may be manufactured by separating the display module 100 from the mold 320. In some embodiments, the mold 320 and the display module 100 may be separated by removing the mold 320 using a roller 380 after removing the support member 350. The mold 320 and the display module 100 may be separated by other methods as well. In some embodiments, when the mold 320 has a hydrophobic property and the window 140 has a hydrophilic property, the bonding force between the mold 320 and the window 140 is small so that the mold 320 can be removed more smoothly and/or easily.

In some embodiments, the manufacturing process of the window 140 is performed in a state in which the driving circuit 160 and/or the circuit board 170 are disposed on one surface (e.g., the first surface) of the display panel 110. In some other embodiments, the manufacturing process of the window 140 is performed without providing the driving circuit 160 and/or the circuit board 170 to the display module 100. In this case, after the window 140 is manufactured, the driving circuit 160 and/or the circuit board 170 may be disposed on one surface of the display panel 110.

Thereafter, a bending process (e.g., a process of bending the display panel 110 in the bending area BA) may be performed to manufacture the bent display module 100 as shown in the embodiments of FIGS. 2 or 3. In some embodiments, the polarization layer 120 is attached only to the first flat area FA1 of the display panel 110 and is not attached to the bending area BA of the display panel 110. Accordingly, the display panel 110 may be appropriately and/or smoothly bent without performing an additional bending process.

FIGS. 17 to 21 are cross-sectional views illustrating a method for manufacturing a display device according to some embodiments of the present disclosure. For example, FIGS. 17 to 21 sequentially illustrate the manufacturing steps for forming an integrated window 140' in relation to a display module 100', which is a main component of the display device 10.

Figure 17:
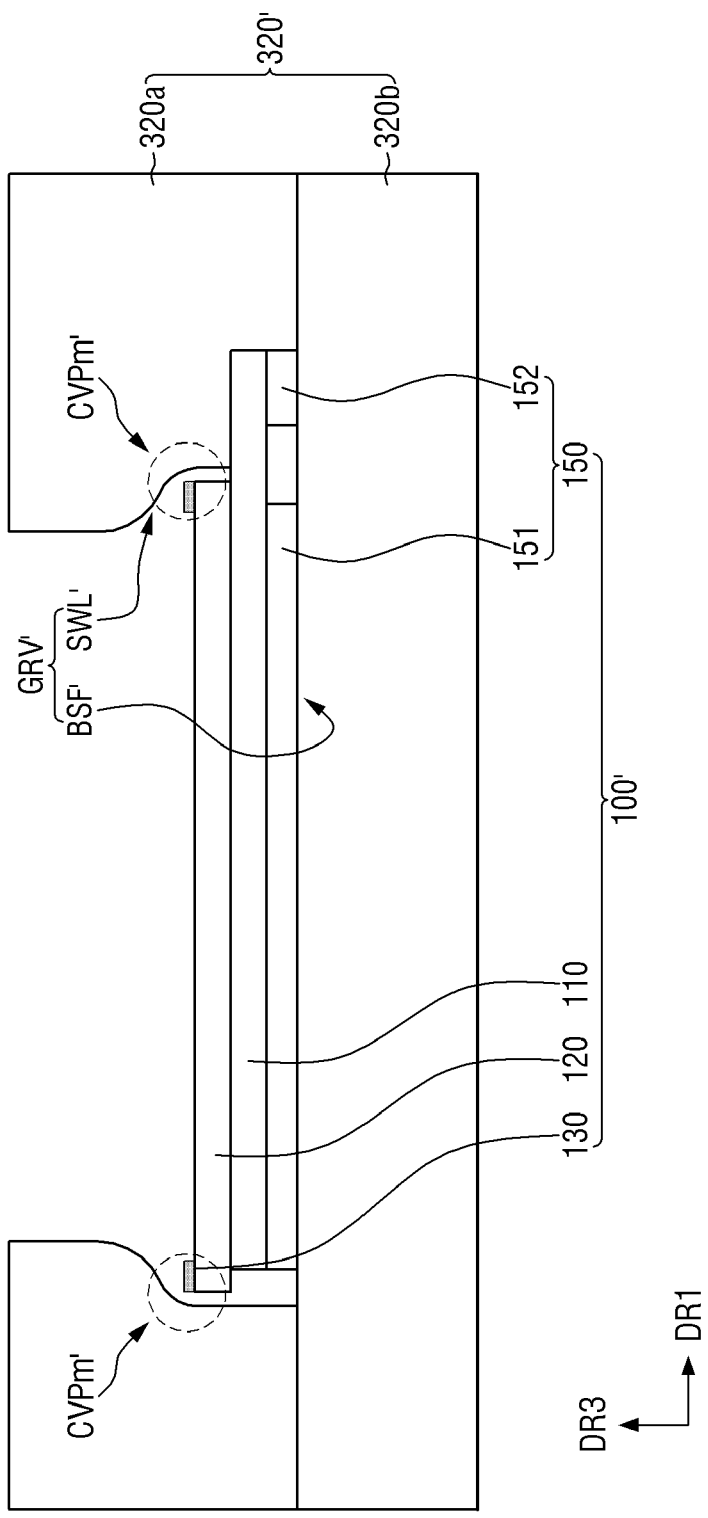
Figure 18:
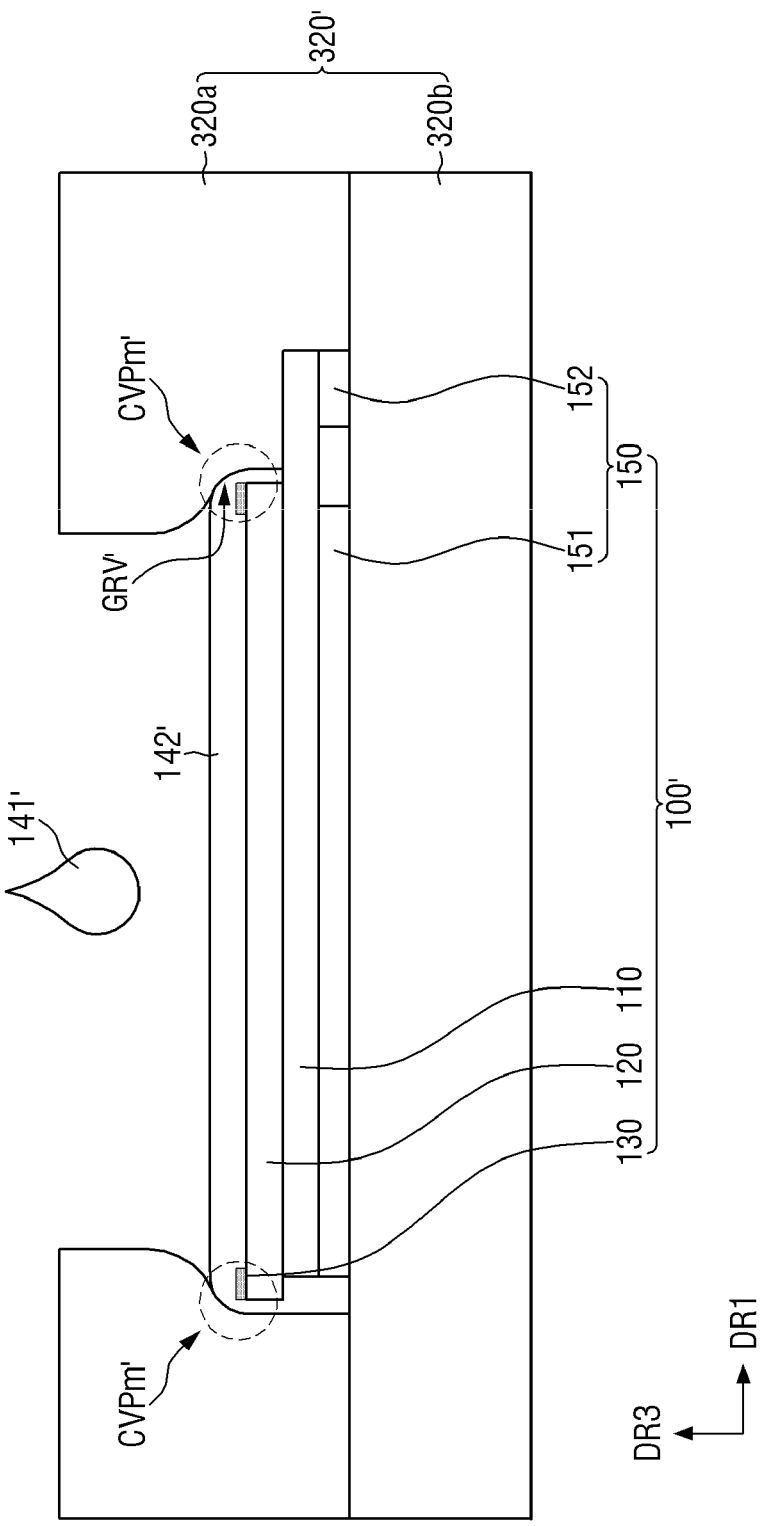
Figure 22:
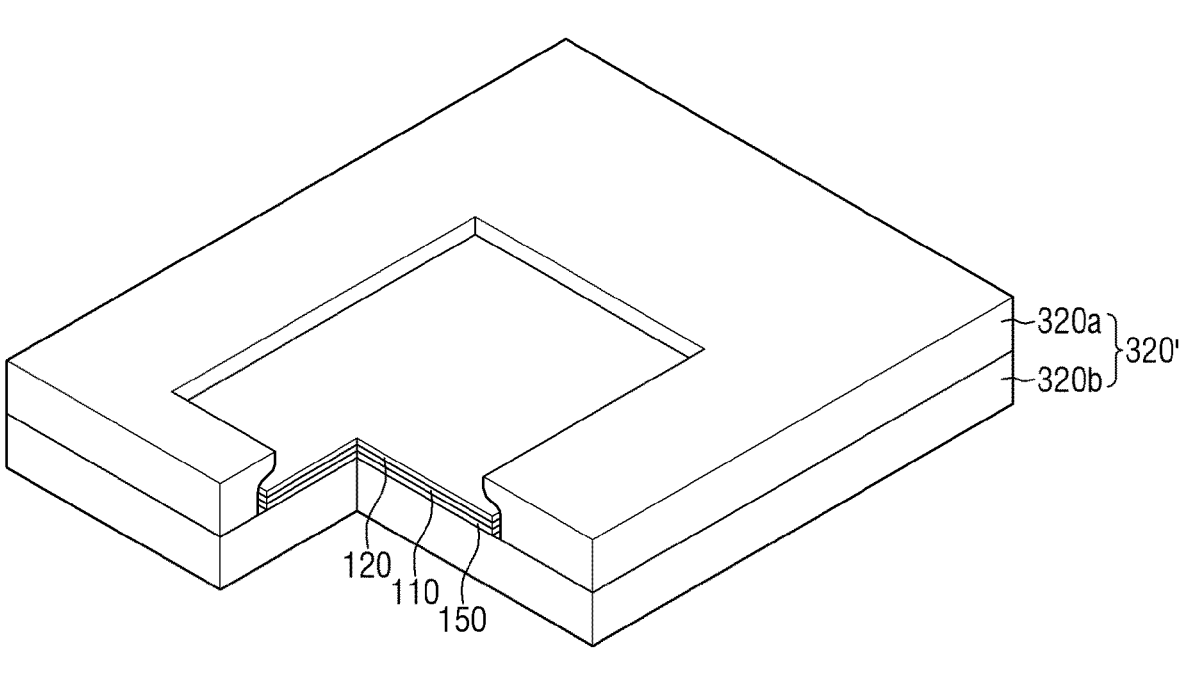
FIG. 22 is a perspective view schematically illustrating a method for manufacturing the display device at the step illustrated in FIG. 17.
Figure 22:
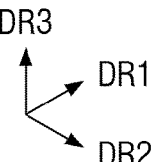
Figure 23:
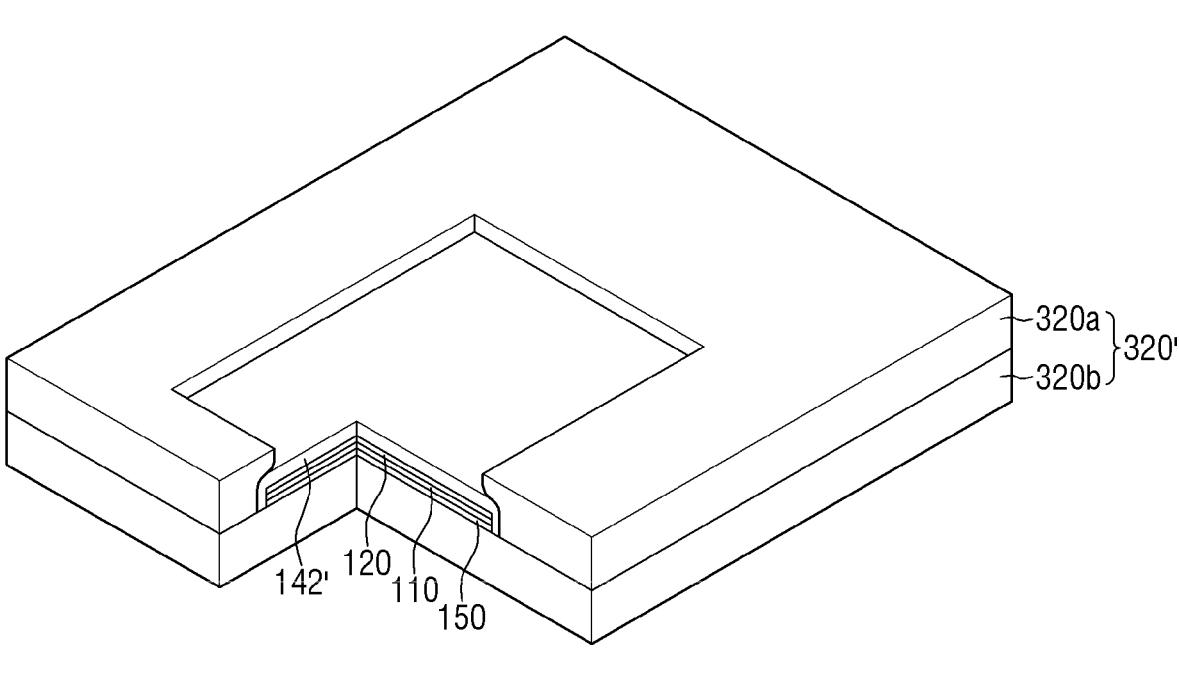
FIG. 23 is a perspective view schematically illustrating a method for manufacturing the display device at the step illustrated in FIG. 18.
Figure 23:
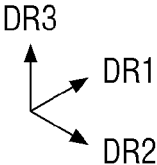

FIG. 22 is a perspective view schematically illustrating a method for manufacturing the display device 10 at the step illustrated in FIG. 17, and FIG. 23 is a perspective view schematically illustrating a method for manufacturing the display device 10 at the step illustrated in FIG. 18. For example, FIGS. 22 and 23 schematically illustrate a mold 320' that can be used in the manufacturing steps of FIGS. 17 and 18 and the display module 100' disposed inside the mold 320'.

Referring to FIGS. 17 and 22 in addition to FIGS. 1 to 16, the mold 320' including side frame 320a and a support plate 320b may be manufactured, and the display module 100' including the display panel 110 and the polarization layer 120 may be manufactured or prepared. In describing the present embodiment, the side frame 320a and the support plate 320b has been described to be combined to form the mold 320' for convenience. However, the side frame 320a and the support plate 320b may be regarded as separate components. For example, the side frame 320a may be the mold 320', and the support plate 320b may be regarded as a component separate from the mold 320'. In addition, the side frame 320a and the support plate 320b may be prepared in a state in which they are separated from each other.

Figure 19:
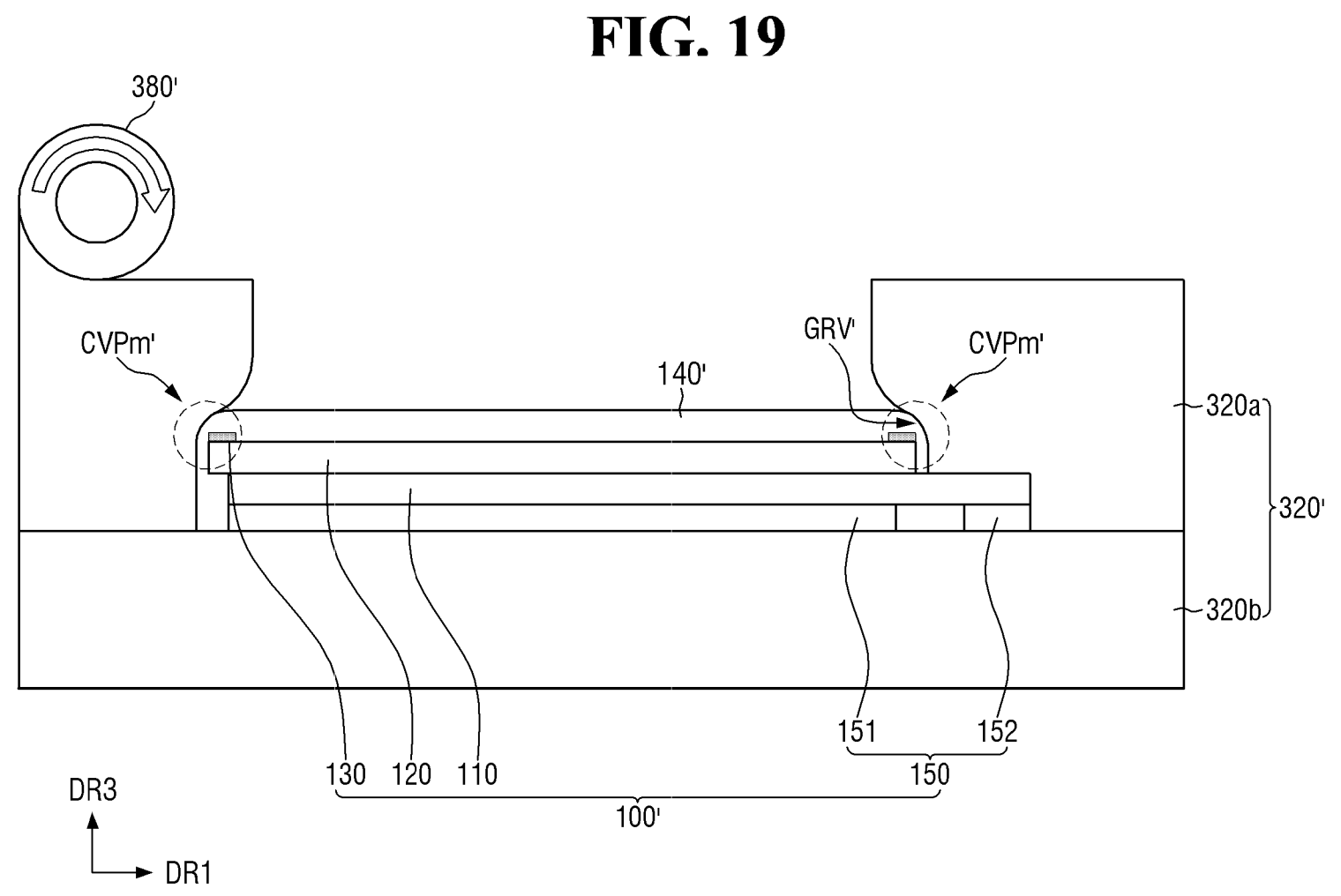

In the manufacturing steps of FIGS. 17 and 22, the display module 100' may not include some components such as a window (e.g., the window 140' of FIG. 19). When the mold 320' and the display module 100' are prepared, the display module 100' may be placed in the mold 320' (or on the mold 320'). In some embodiments, the display module 100' is disposed so that the polarization layer 120 is exposed thereon.

In some embodiments, the mold 320' includes a groove GRV' formed in an inner space by the side frame 320a and the support plate 320b. For example, the groove GRV' may include a bottom surface BSF' formed by the support plate 320b and a side wall SWL' formed by the side frame 320a. The side frame 320a may have a curved surface CVPm' corresponding to the shape of the window 140' to be manufactured at the side wall SWL' of the groove GRV'. Accordingly, the groove GRV' may have the curved surface CVPm' at a portion of the side wall SWL'.

In some embodiments, after the display module 100' is disposed on the support plate 320b, the side frame 320a may be disposed on the support plate 320b to surround the display module 100'. Accordingly, the display module 100' may be disposed on the groove GRV' (or inside the groove GRV').

In some embodiments, the side frame 320a may be formed of a material that can transmit light (e.g., ultraviolet rays) that can be used to cure a coating layer 142' formed in a subsequent process. For example, the side frame 320a may include at least one material of PDMS or other silicon-based light-transmitting polymer resin; however, embodiments of the present disclosure are not limited thereto.

In some embodiments, the support plate 320b may be formed of a material having strength capable of stably supporting the side frame 320a and the display module 100' during the process of manufacturing the window 140'. For example, the support plate 320b may be a high-strength metal plate; however, embodiments of the present disclosure are not limited thereto.

Referring to FIGS. 18 and 23 in addition to FIGS. 1 to 17, the coating layer 142' may be formed by applying a coating material 141' on the display module 100'. The coating layer 142' may be formed to have an appropriate thickness and/or height in consideration of the thickness of the window 140' to be manufactured, and may have a shape corresponding to the groove GRV'. For example, the coating layer 142' may have a curved surface corresponding to (e.g., matching) a curved portion CVPm' of the groove GRV'. In some embodiments, the coating material 141' is a resin or other suitable material.

Figure 20:
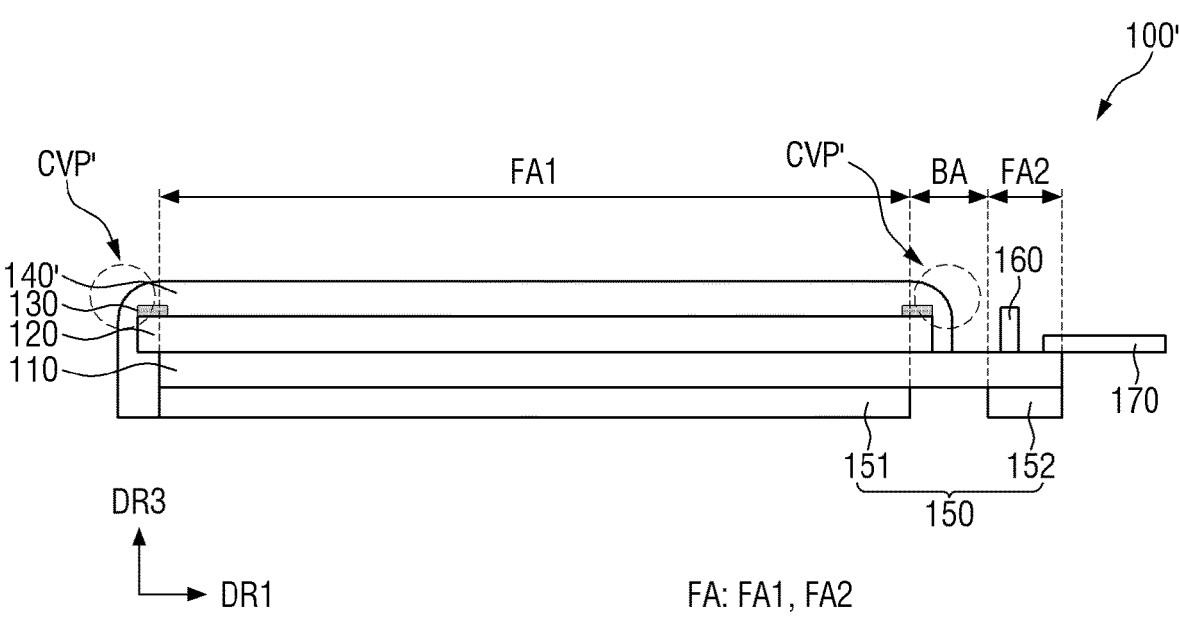

Referring to FIGS. 19 and 20 in addition to FIGS. 1 to 18, the window 140' may be manufactured by curing the coating layer 142'. In some embodiments, the coating layer 142' is photocured by irradiating light (e.g., ultraviolet rays) from the top of the display module 100' including the window 140'. According to the above-described embodiment, the curing rate of the coating layer 142' can be increased by performing a photocuring process in a state in which the upper surface of the coating layer 142' is exposed. Accordingly, the coating layer 142' is uniformly cured as a whole to manufacture the window 140' with a higher quality.

When manufacturing of the window 140' is completed, the display module 100' including the window 140' may be separated from the mold 320'. For example, the side frame 320a of the mold 320' may be removed using a roller 380', and the display module 100' may be separated from the mold 320'. In addition to this, the mold 320' and the display module 100' may be separated by other methods.

Accordingly, the display module 100' including the window 140' may be manufactured. In the above-described embodiments, when there is a space into which the coating material 141' can be introduced between the side surface of the polarization layer 120 and the side frame 320a of the mold 320', the window 140' may not only cover the upper surface of the polarization layer 120, but also cover the side surface of the polarization layer 120.

In some embodiments, the manufacturing process of the window 140' may be performed without providing a driving circuit 160' and/or a circuit board 170' to the display module 100'. In such examples, after the display module 100' including the window 140' is separated from the mold 320', the driving circuit 160 and/or the circuit board 170 may be disposed on the display panel 110.

Figure 21:
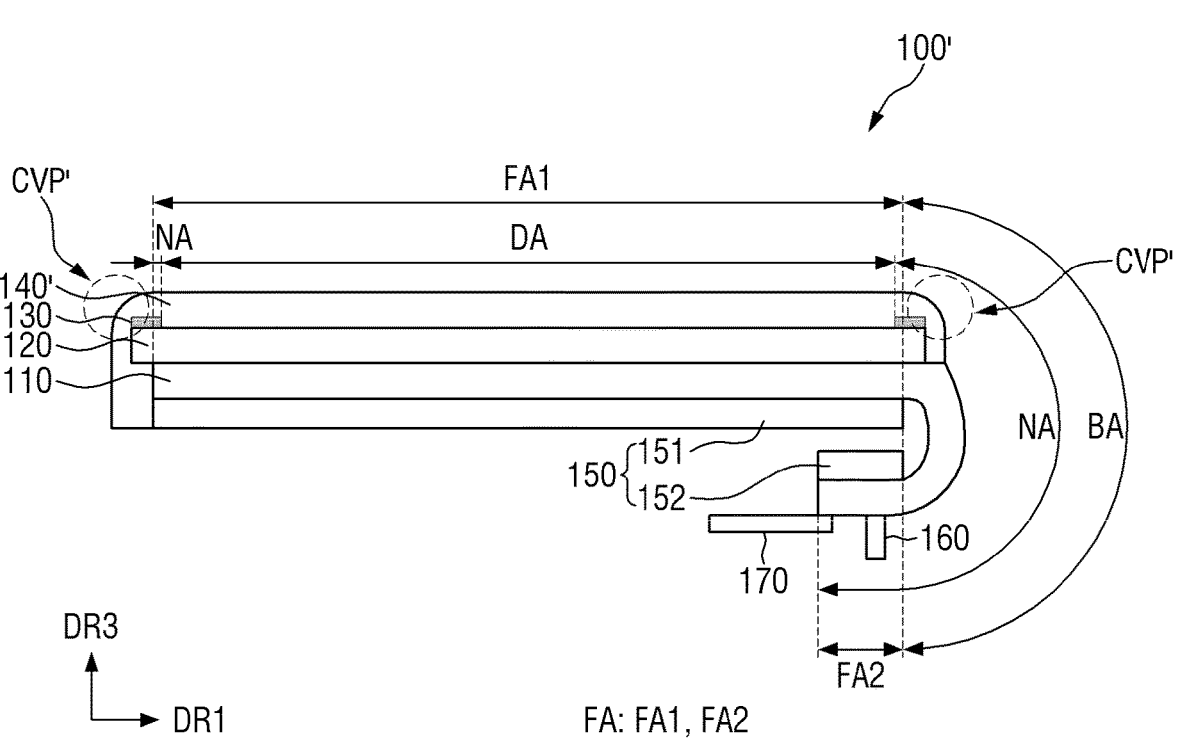

Referring to FIG. 21 in addition to FIGS. 1 to 20, the bent display module 100' may be manufactured by bending the display panel 110 in the bending area BA. In some embodiments, the display panel 110 may be bent in an area not covered by the window 140' among the bending areas BA. In some embodiments, the polarization layer 120 is attached to the display panel 110 only in the first flat area FA1 and is not attached to the display panel 110 in the bending area BA. For example, the display module 100' may include an adhesive layer (e.g., the adhesive layer 180 of FIG. 3) positioned between the display panel 110 and the polarization layer 120, and the adhesive layer 180 may be provided only to the first flat area FA1. Although it is illustrated that the polarization layer 120 is in contact with the display panel 110 in one portion of the bending area BA in FIG. 21, when adhesive layer 180 is only provided in the first flat area FA1 between the display panel 110 and the polarization layer 120, at least one portion of the polarization layer 120 may be spaced apart or be separated from the display panel 110 in the bending area BA when the display panel is bent.

Figure 24:
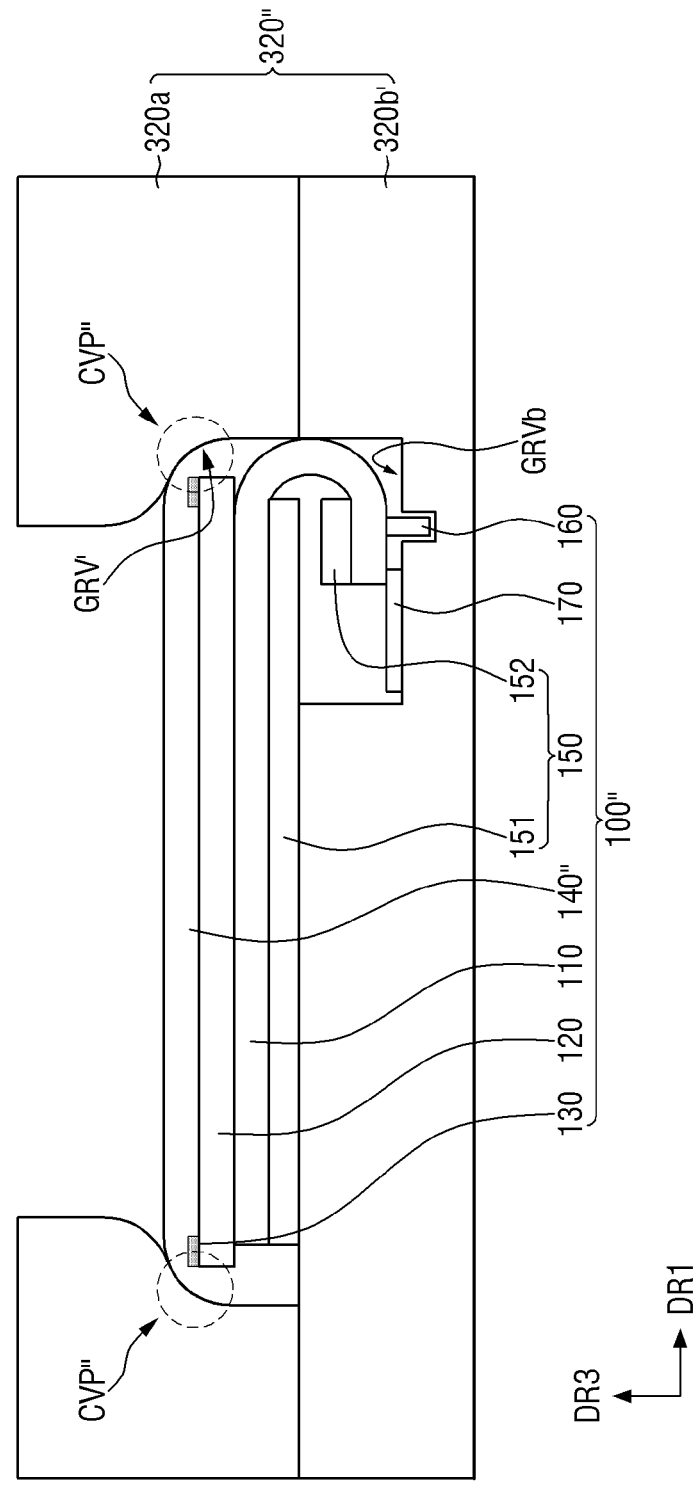
FIGS. 24 and 25 are cross-sectional views illustrating a method for manufacturing a display device according to some embodiments of the present disclosure.
Figure 25:
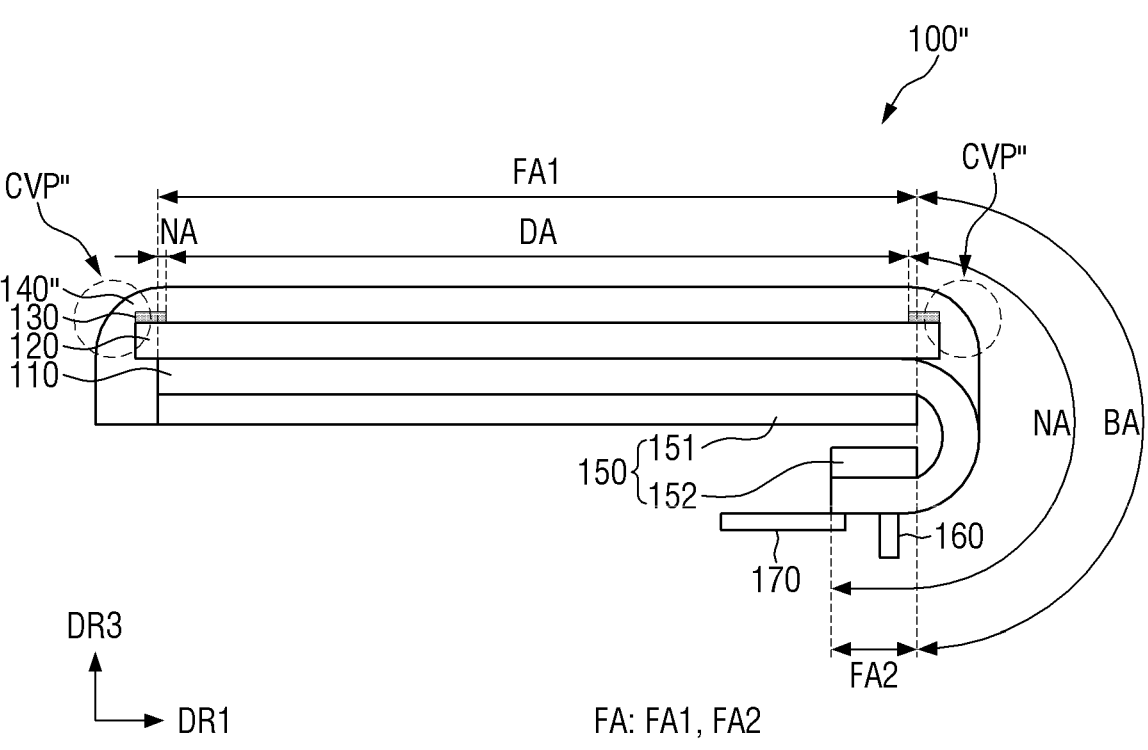

FIGS. 24 and 25 are cross-sectional views illustrating a method for manufacturing a display device 10 according to some embodiments of the present disclosure. For example, in FIGS. 24 and 25, in manufacturing a window 140" of a display module 100", a method for manufacturing the window 140" using a mold 320" which includes a support plate 320*b'* including a groove GRVb is illustrated. In describing the embodiments of FIGS. 24 and 25, descriptions of substantially the same or similar configurations to those of embodiments of FIGS. 17 to 23 may not be repeated.

Referring to FIG. 24 in addition to FIGS. 17 to 23, the support plate 320*b'* of the mold 320" may include the groove GRVb. In some embodiments, the groove GRVb of the support plate 320*b'* is formed to manufacture the window 140" in which the display module 100" including the driving circuit 160 and/or the circuit board 170 is bent. For example, the groove GRVb of the support plate 320*b'* may be formed in size and/or shape that are capable of accommodating a portion of the display module 100" (or components disposed in the portion of the display module 100") that is bent toward the rear side. Accordingly, the window 140" may be manufactured in a state in which the display module 100" is bent. In some embodiments, the groove GRVb of the support plate 320*b'* may be connected to the groove GRV' of the side frame 320*a* in series; however, embodiments of the present disclosure are not limited thereto.

Referring to FIG. 25 in addition to FIGS. 17 to 24, when manufacturing of the window 140" including a curved portion CVP" is completed, the display module 100" including the window 140" may be separated from the mold 320". Accordingly, the display module 100" including the window 140" may be manufactured.

According to the above-described embodiments, the windows 140, 140' or 140" may be directly formed on the display modules 100, 100' or 100", respectively, without a separate adhesive, by using the molds 320, 320' or 320" having grooves GRV, GRV' or GRV", respectively, corresponding to the shapes of the windows 140, 140' or 140" including the curved portions CVP, CVP' or CVP", respectively. For example, the windows 140, 140' or 140" may be directly adhered to and formed on the polarization layer 120 of the display modules 100, 100' or 100", respectively, by using the molds 320, 320' or 320" having grooves GRV, GRV' or GRV", respectively, having sizes and shapes corresponding to the sizes and shapes of the windows 140, 140' or 140", respectively, to be manufactured.

Accordingly, without going through an additional process (for example, a laser cutting or chamfering process) for forming the curved portions CVP, CVP' or CVP" of the windows 140, 140' or 140", the windows 140, 140' or 140" including the smooth curved portions CVP, CVP' or CVP" and integral with the display modules 100, 100' or 100", respectively, may be formed or manufactured. In addition, by providing the windows 140, 140' or 140" to the display modules 100, 100' or 100" without a separate adhesive member, the bonding process and/or the lamination process may be omitted (e.g., removed).

Accordingly, the thickness of the display modules 100, 100' or 100" can be reduced and the defect rate can also be reduced. In addition, it is possible to simplify the manufacturing process of the display modules 100, 100' or 100" and reduce manufacturing costs.

Accordingly, while simplifying the manufacturing process of the display device 10 including the display modules 100, 100' or 100" and reducing manufacturing costs, the display device 10 including the windows 140, 140' or 140" of excellent quality (e.g., with minimal defects) can be produced.

In some embodiments, the display modules 100, 100' or 100" may include a flat area FA (e.g., the first flat area FA1) including the display area DA and a bending area BA extending from the flat area FA, and the polarization layer 120 and the window 140, 140' or 140" may expand to cover the peripheral area (e.g., area including one portion of the bending area BA adjacent to the flat area FA) of the flat area FA. Accordingly, the display panel 110 can be stably protected and durability of the display modules 100, 100' or 100" and the display device 10 including the display modules 100, 100' or 100" can be ensured (e.g., secured).

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept."

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A display device comprising:
a display panel having a display area and a non-display area, and comprising:
a first flat area comprising the display area; and
a bending area extending from the first flat area and comprising a portion of the non-display area;
a polarization layer on a first surface of the display panel and covering the display area and a portion of the non-display area adjacent to the display area; and
a window directly on the polarization layer and covering the display area and the portion of the non-display area adjacent to the display area, the window comprising a curved portion on the portion of the non-display area, wherein the polarization layer and the window extend in a direction opposite to the bending area on a plane crossing a thickness direction of the display panel to protrude more outward than the display panel in the direction opposite to the bending area.

2. The display device of claim 1, wherein the polarization layer covers the first flat area and a portion of the bending area, is attached on the first flat area, and is separated from the bending area.

3. The display device of claim 1, wherein the display panel further has a second flat area extending from the bending area and comprising another portion of the non-display area.

4. The display device of claim 3, wherein the display panel is bent in the bending area so that a second surface of the first flat area faces a second surface of the second flat area.

5. The display device of claim 3, further comprising at least one of:
a cover panel on a second surface of the display panel in the first flat area and the second flat area;
a driving circuit on the first surface of the display panel in the second flat area; and
a circuit board connected to the display panel in the second flat area.

6. The display device of claim 1, wherein a thickness of the curved portion continuously and gradually decreases toward an edge of the window.

7. The display device of claim 1, wherein the window comprises a resin coating layer in direct contact with the polarization layer.

8. The display device of claim 1, further comprising a light blocking pattern on an edge of the polarization layer and covering a peripheral portion of the display area.

9. A display device comprising:
a display panel having a flat area comprising a display area and a bending area comprising a portion of a non-display area;
a polarization layer attached on the flat area of the display panel and covering the flat area and a portion of the bending area adjacent to the flat area; and
a window directly on the polarization layer and covering the flat area and the portion of the bending area, the window comprising a curved surface on the portion of the bending area,
wherein the polarization layer and the window extend in a direction opposite to the bending area on a plane crossing a thickness direction of the display panel to protrude more outward than the display panel in the direction opposite to the bending area.

10. The display device of claim 9, wherein the polarization layer and the window comprise an edge protruding from both sides of the flat area on a plane crossing the thickness direction of the display panel and separated from the display panel, and
wherein the window comprises a curved portion at the edge.

11. The display device of claim 9, wherein the window has a curved portion in which a thickness of the curved portion continuously and gradually decreases toward an edge of the window.

12. The display device of claim 9, wherein the window comprises a resin coating layer in direct contact with the polarization layer.

13. The display device of claim 9, further comprising a light blocking pattern on an edge of the polarization layer and covering a peripheral portion of the display area.

14. A method for manufacturing a display device, the method comprising:
manufacturing a mold comprising a bottom surface and a sidewall, and defining a groove having a curved surface at least in a portion of the sidewall;
preparing a display module comprising a display panel, and a polarization layer provided on a surface of the display panel;
forming a window comprising a curved portion corresponding to the curved surface of the groove by forming or placing a coating layer and at least a portion of the display module contacting the coating layer and curing the coating layer; and
separating the display module comprising the window from the mold,
wherein the polarization layer and the window extend in a direction opposite to a bending area of the display panel on a plane crossing a thickness direction of the display panel to protrude more outward than the display panel in the direction opposite to the bending area.

15. The method of claim 14, wherein the display module is placed on the groove so that the polarization layer contacts the coating layer.

16. The method of claim 15, wherein the manufacturing the mold comprises:

preparing a substrate of a size and a shape corresponding to the sizes and shapes of the polarization layer and the window;

forming the mold defining the groove of a size and a shape corresponding to the size and the shape of the substrate by applying a mold material onto a surface of the substrate and by curing; and separating the substrate from the mold.

17. The method of claim 14, wherein the forming the window comprises:

forming the coating layer by applying a coating material onto the groove;

placing the display module on the groove so that a surface of the display module is in contact with the coating layer;

bonding the display module and the coating layer; and forming the window by curing the coating layer.

18. The display device of claim 14, wherein the forming the window comprises:

placing the display module inside the groove;

forming the coating layer by applying a coating material on the display module; and forming the window by curing the coating layer.

\* \* \* \* \*